United States Patent
Esaka

(10) Patent No.: US 11,816,344 B2
(45) Date of Patent: Nov. 14, 2023

(54) MEMORY SYSTEM IN WHICH INFORMATION ON A TIME IN WHICH INTEGRITY OF A STORED DATA PIECE IS CONFIRMED LAST

(71) Applicant: Kioxia Corporation, Tokyo (JP)

(72) Inventor: Naoki Esaka, Kawasaki Kanagawa (JP)

(73) Assignee: Kioxia Corporation, Tokyo (JP)

( * ) Notice: Subject to any disclaimer, the term of this patent is extended or adjusted under 35 U.S.C. 154(b) by 28 days.

(21) Appl. No.: 17/468,880

(22) Filed: Sep. 8, 2021

(65) Prior Publication Data
US 2022/0188005 A1  Jun. 16, 2022

(30) Foreign Application Priority Data
Dec. 16, 2020 (JP) .................. 2020-208475

(51) Int. Cl.
G06F 3/06 (2006.01)

(52) U.S. Cl.
CPC .......... G06F 3/0644 (2013.01); G06F 3/0604 (2013.01); G06F 3/0616 (2013.01); G06F 3/0622 (2013.01); G06F 3/0659 (2013.01); G06F 3/0679 (2013.01)

(58) Field of Classification Search
CPC .... G06F 3/0604; G06F 3/0616; G06F 3/0622; G06F 3/0644; G06F 3/0659; G06F 3/0679
USPC ....................................... 711/154
See application file for complete search history.

(56) References Cited

U.S. PATENT DOCUMENTS

| | | | |
|---|---|---|---|
| 7,107,272 B1* | 9/2006 | Milligan | G06F 16/907 |
| 7,149,946 B2* | 12/2006 | Peretz | G06F 11/1008 |
| | | | 714/E11.034 |
| 8,539,310 B2* | 9/2013 | Sasaki | G11C 11/406 |
| | | | 714/764 |
| 9,405,671 B2 | 8/2016 | Tanaka et al. | |
| 2006/0039196 A1* | 2/2006 | Gorobets | G06F 11/106 |
| | | | 714/E11.038 |
| 2006/0219772 A1* | 10/2006 | Bernstein | G06F 16/2308 |
| | | | 235/379 |
| 2009/0282301 A1* | 11/2009 | Flynn | G06F 12/0246 |
| | | | 714/763 |
| 2014/0351446 A1 | 11/2014 | Cho et al. | |

(Continued)

FOREIGN PATENT DOCUMENTS

| CN | 101903866 A | 12/2010 |
|---|---|---|
| WO | WO-2009/067476 A2 | 5/2009 |
| WO | WO-2012/001917 A1 | 1/2012 |

OTHER PUBLICATIONS

NVM Express, Inc., "NVM Technical Proposal for New Feature", Technical Proposal ID 4053-Zoned Namespaces, Jun. 15, 2020, 70 pages https://nvmexpress.org/developers/nvmespecification/.

*Primary Examiner* — Reginald G Bragdon
*Assistant Examiner* — Aaron D Ho
(74) *Attorney, Agent, or Firm* — Foley & Lardner LLP

(57) ABSTRACT

According to one embodiment, a memory system includes a nonvolatile memory and a controller. The controller manages at least one storage area that is obtained by logically dividing a storage space of the nonvolatile memory. One or more storage areas in the at least one storage area store one or more data pieces, respectively. The controller manages first information on one or more times in which integrity of the one or more data pieces have been confirmed last, respectively.

24 Claims, 19 Drawing Sheets

(56) References Cited

U.S. PATENT DOCUMENTS

2016/0328488 A1* 11/2016 Lytle .................... G06F 21/64
2016/0350164 A1* 12/2016 Cunningham ..... G11C 16/3418
2019/0004888 A1* 1/2019 Chagam Reddy .. G06F 11/0727
2019/0258585 A1 8/2019 Marcu et al.
2020/0026427 A1* 1/2020 Peleg .................... G06F 3/0658
2020/0244596 A1* 7/2020 Le ........................ G06F 11/1004

* cited by examiner

F.I.G. 1

| LBA | Physical address |
|---|---|
| 0 | X |
| 1 | Y |
| 2 | Z |
| ⋮ | ⋮ |
F I G. 2
| LBA | Last confirmation time (min) |
|---|---|
| LBA1 | 1(min) |
| LBA100 | 14400(min) |
| LBA101 | 108000(min) |
F I G. 3
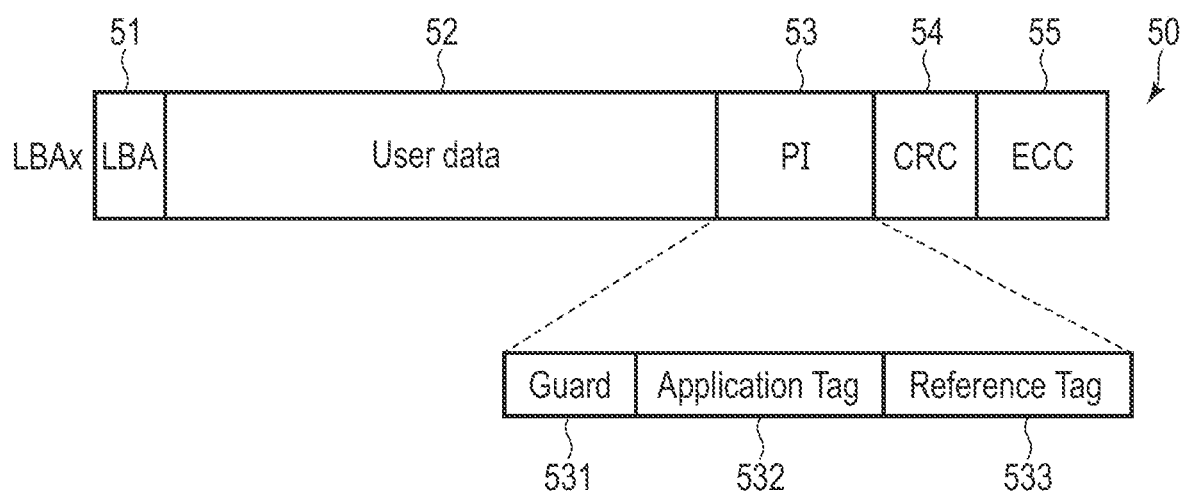
F I G. 4

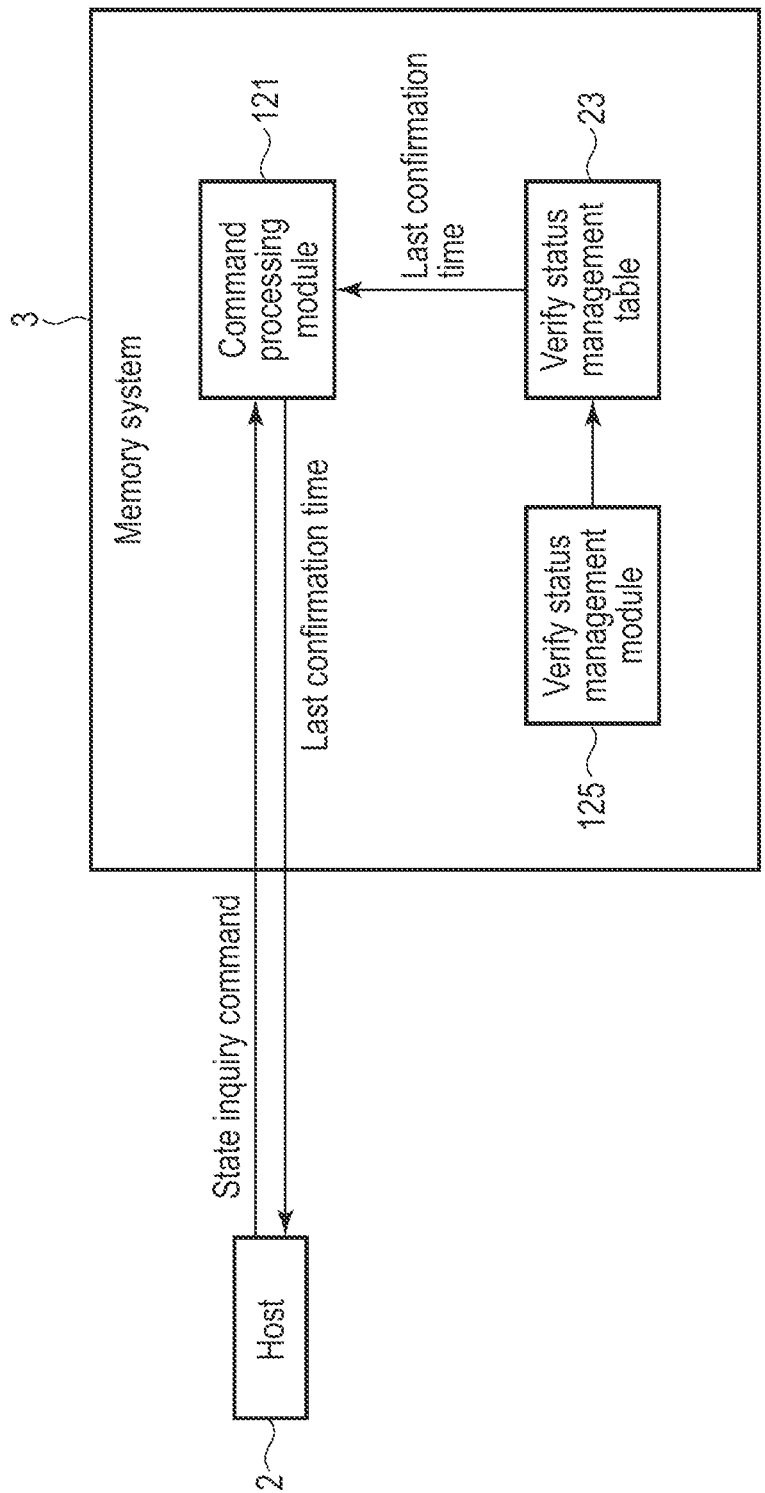
F I G. 5

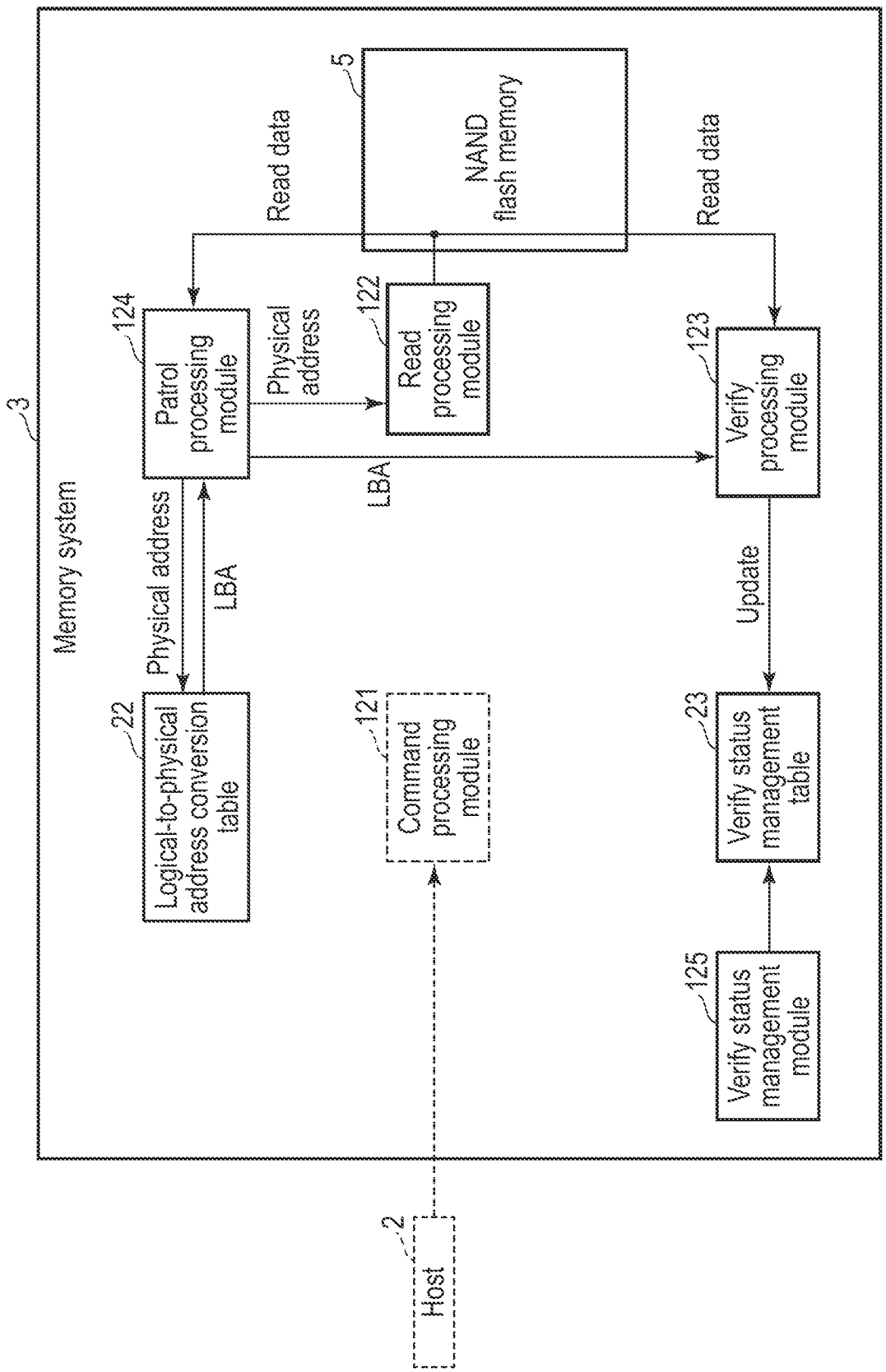
F I G. 8

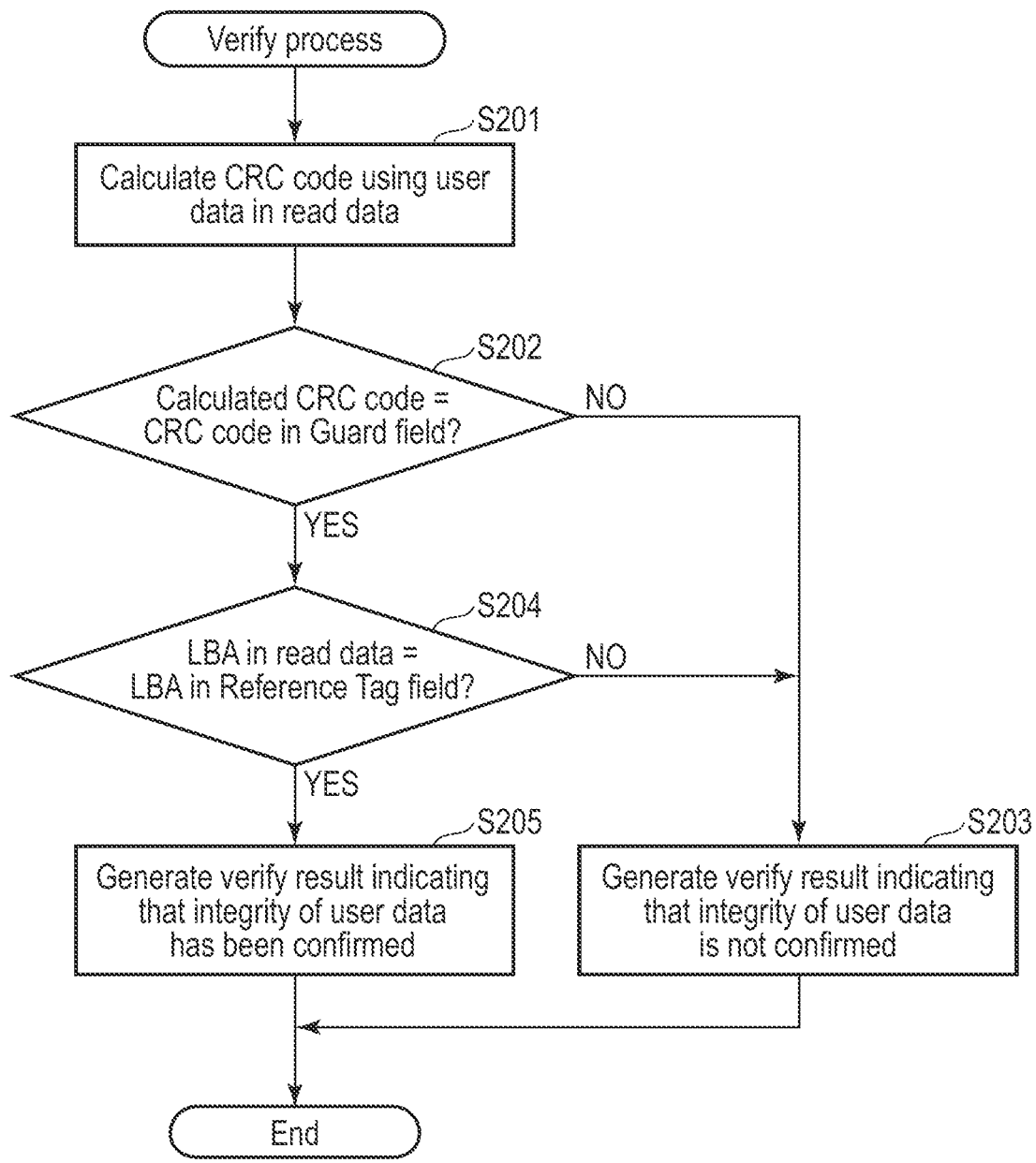
F I G. 10

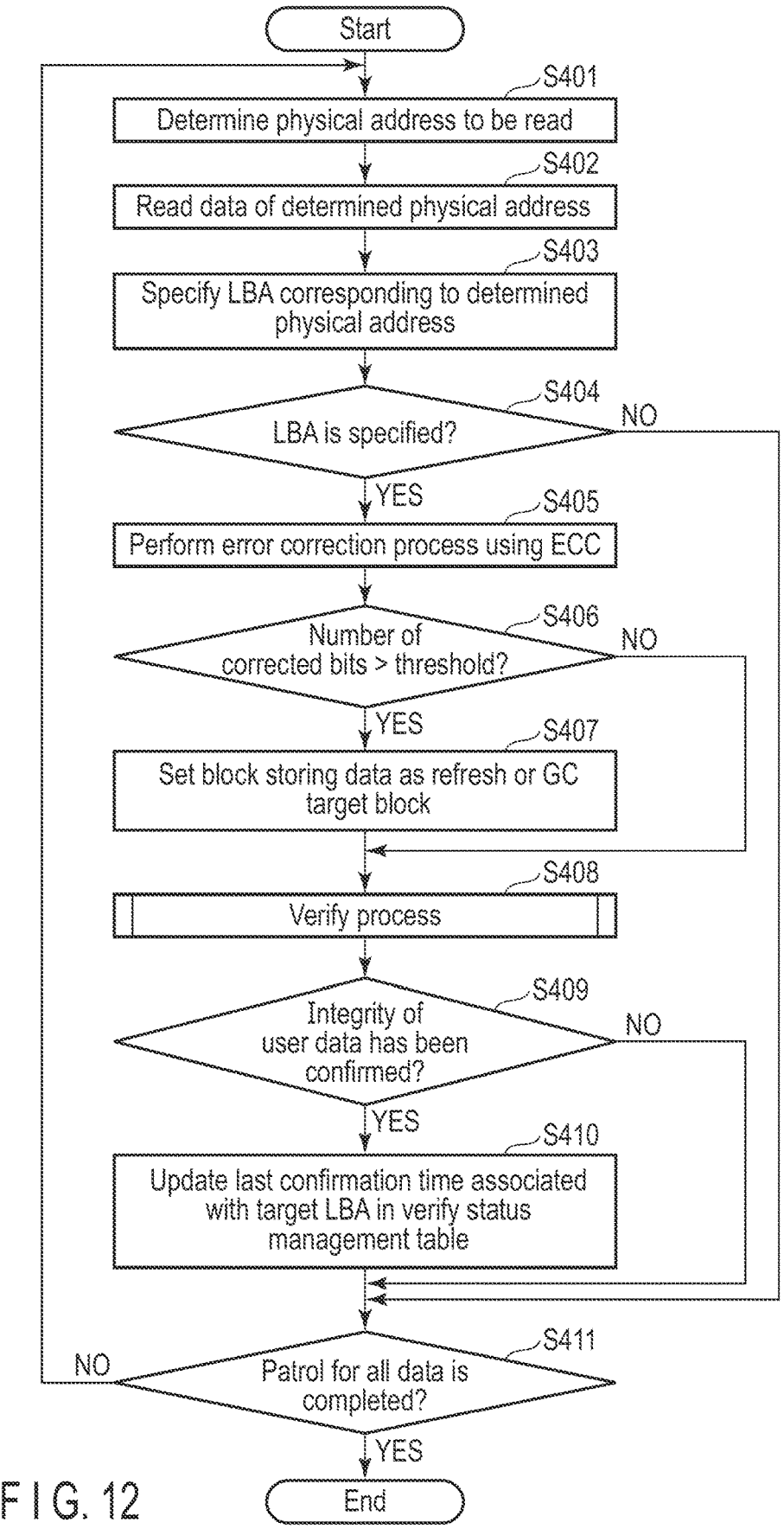
F I G. 12

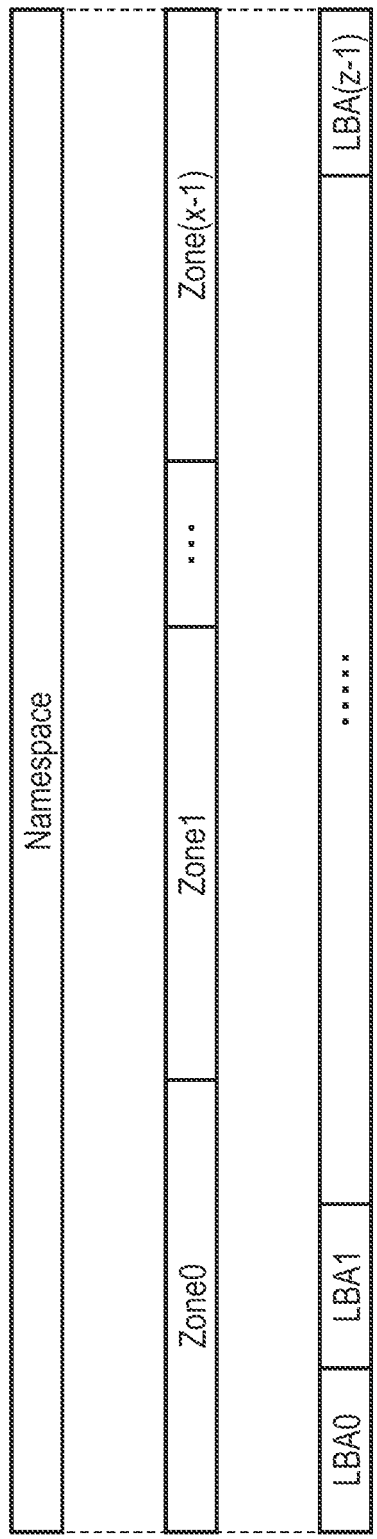
F I G. 13

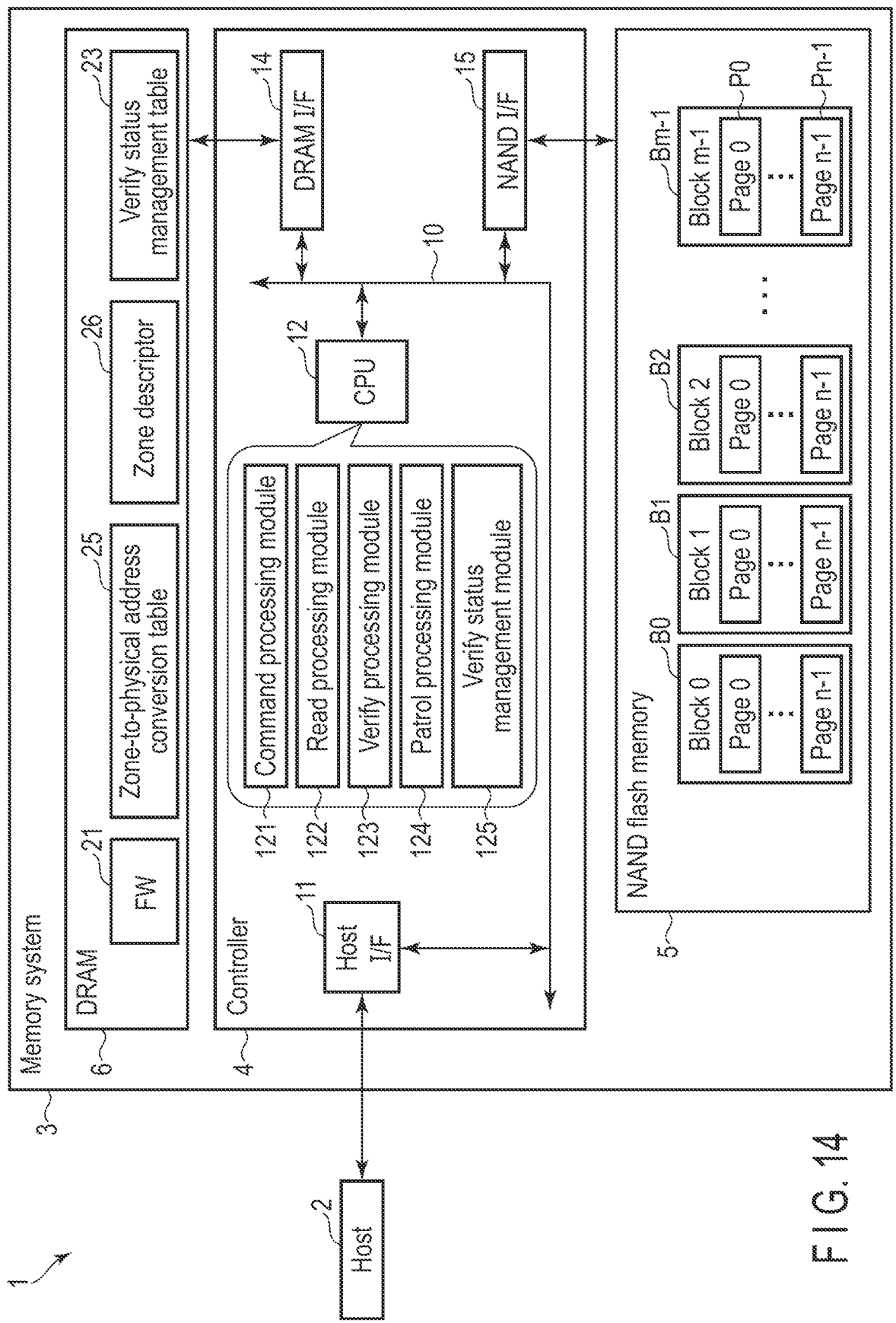
F I G. 14

| Zone | Physical address |
|---|---|
| 0 | X |
| 1 | Y |
| 2 | Z |
| ⋮ | ⋮ |

F I G. 15

| LBA | Last confirmation time(min) |
|---|---|
| Zone1 | 1(min) |
| Zone100 | 14400(min) |
| Zone101 | 108000(min) |

F I G. 16

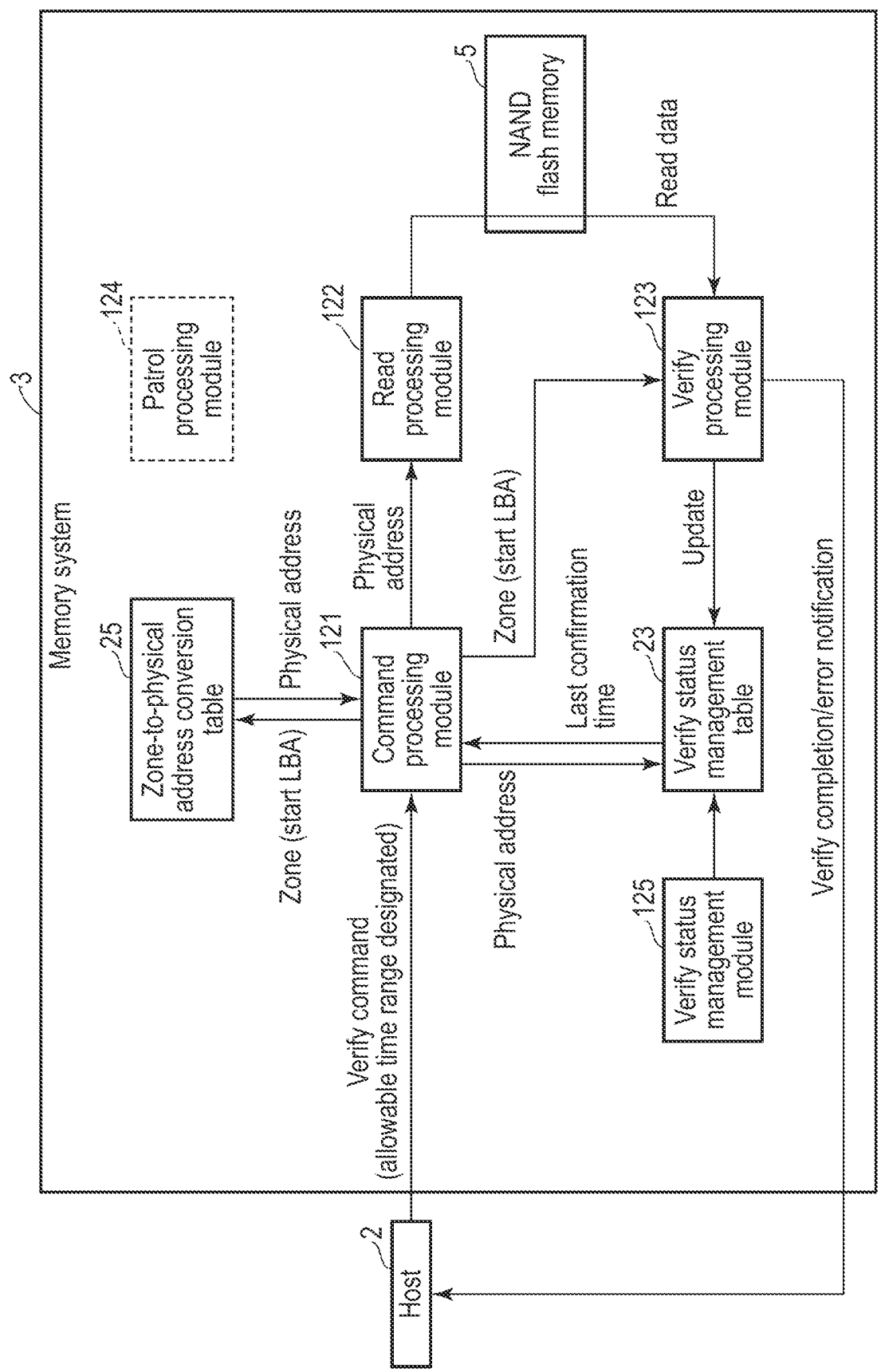
F I G. 18

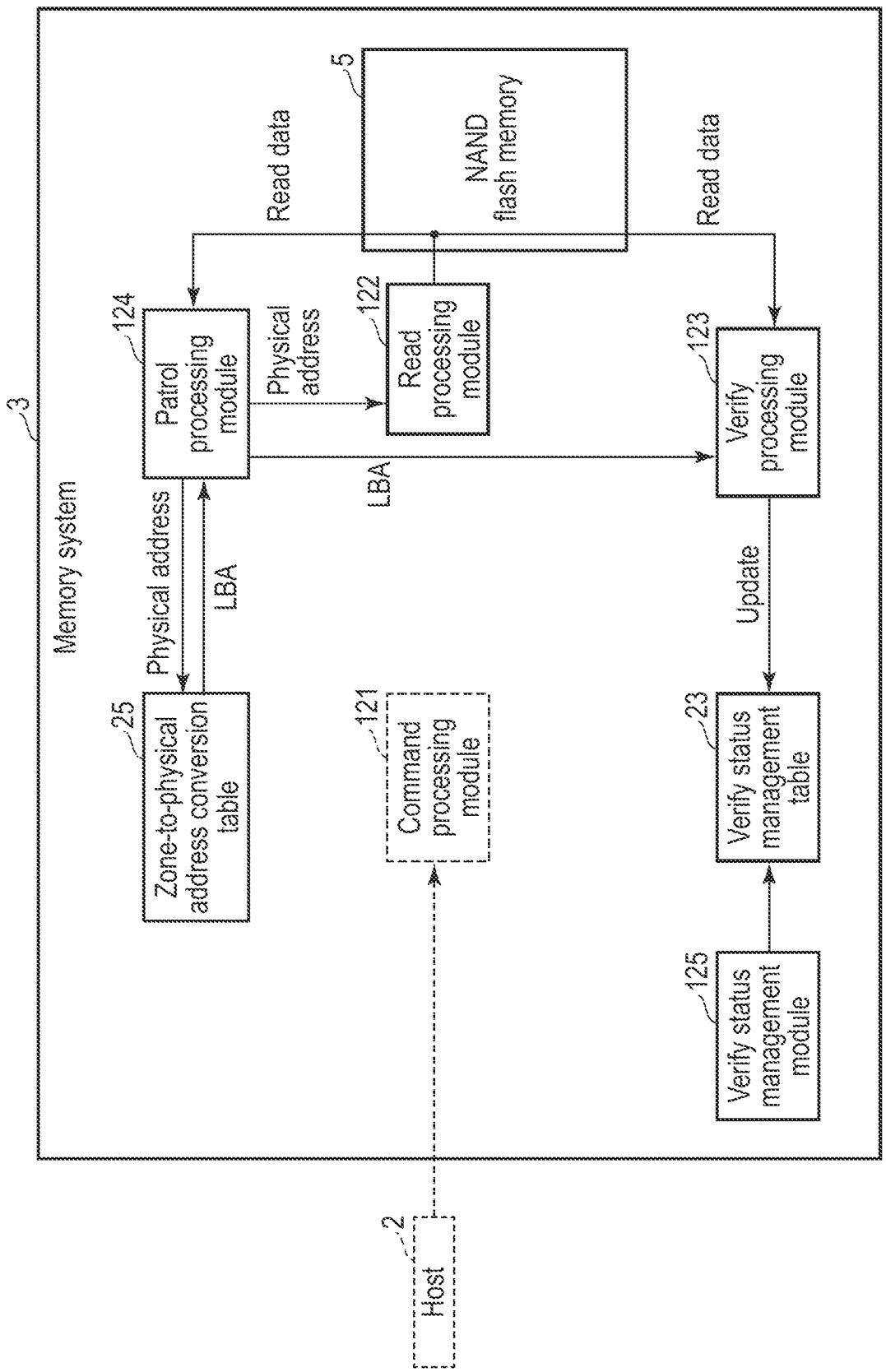
F I G. 19

MEMORY SYSTEM IN WHICH INFORMATION ON A TIME IN WHICH INTEGRITY OF A STORED DATA PIECE IS CONFIRMED LAST

CROSS-REFERENCE TO RELATED APPLICATIONS

This application is based upon and claims the benefit of priority from Japanese Patent Application No. 2020-208475, filed Dec. 16, 2020, the entire contents of which are incorporated herein by reference.

FIELD

Embodiments described herein relate generally to a technique for controlling a memory system that includes a nonvolatile memory.

BACKGROUND

In recent years, memory systems including a nonvolatile memory are widely used. As one of such memory systems, a solid state drive (SSD) including a NAND flash memory is known. The SSD is used as a main storage for various computing devices.

A memory system and a host may respectively perform processes for writing data in the nonvolatile memory, reading data written in the nonvolatile memory, and maintaining data written in the nonvolatile memory.

The memory system periodically performs a process called "patrol", for example. In the patrol process, data is read from the nonvolatile memory, and an error correction process is performed on the read data. For example, in a case where the number of bits in which errors have been corrected exceeds a threshold, a block storing the data becomes a target of refresh processing or garbage collection (GC).

Further, the host periodically performs a process called "scrubbing", for example. In the scrubbing process, all the data is read from the nonvolatile memory, and verification (for example, checksum confirmation) of the read data is performed.

In the patrol process and the scrubbing process, access to the nonvolatile memory occurs. An increase in access to the nonvolatile memory causes wear of the nonvolatile memory. Therefore, it is necessary to realize a new function capable of maintaining data while mitigating the wear of the nonvolatile memory.

BRIEF DESCRIPTION OF THE DRAWINGS

FIG. 2 is a view illustrating a configuration example of a logical-to-physical address conversion table used in the memory system of the first embodiment.

FIG. 3 is a view illustrating a configuration example of a verify status management table used in the memory system of the first embodiment.

FIG. 4 is a view illustrating an example of a data structure associated with one logical block address (LBA) in the memory system of the first embodiment.

FIG. 5 is a block diagram illustrating an example of an operation in accordance with a state inquiry command in the memory system of the first embodiment.

FIG. 8 is a block diagram illustrating an example of a verify process accompanying a patrol process in the memory system of the first embodiment.

FIG. 10 is a flowchart illustrating an example of the procedure of a verify process executed in the memory system of the first embodiment.

FIG. 12 is a flowchart illustrating an example of the procedure of the verify process accompanying the patrol process executed in the memory system of the first embodiment.

FIG. 13 is a view illustrating a configuration example of a zoned namespace managed in a memory system according to a second embodiment.

FIG. 14 is a block diagram illustrating a configuration example of an information processing system including the memory system of the second embodiment.

FIG. 15 is a view illustrating a configuration example of a zone-to-physical address conversion table used in the memory system of the second embodiment.

FIG. 16 is a view illustrating a configuration example of a verify status management table used in the memory system of the second embodiment.

FIG. 18 is a block diagram illustrating an example of an operation in accordance with a verify command that designates an allowable time range, in the memory system of the second embodiment.

FIG. 19 is a block diagram illustrating an example of a verify process accompanying a patrol process in the memory system of the second embodiment.

DETAILED DESCRIPTION

Various embodiments will be described hereinafter with reference to the accompanying drawings.

In general, according to one embodiment, a memory system includes a nonvolatile memory and a controller. The controller manages at least one storage area that is obtained by logically dividing a storage space of the nonvolatile memory. One or more storage areas in the at least one storage area store one or more data pieces, respectively. The controller manages first information on one or more times in which integrity of the one or more data pieces have been confirmed last, respectively.

(First Embodiment) FIG. 1 to FIG. 12

Figure 1:
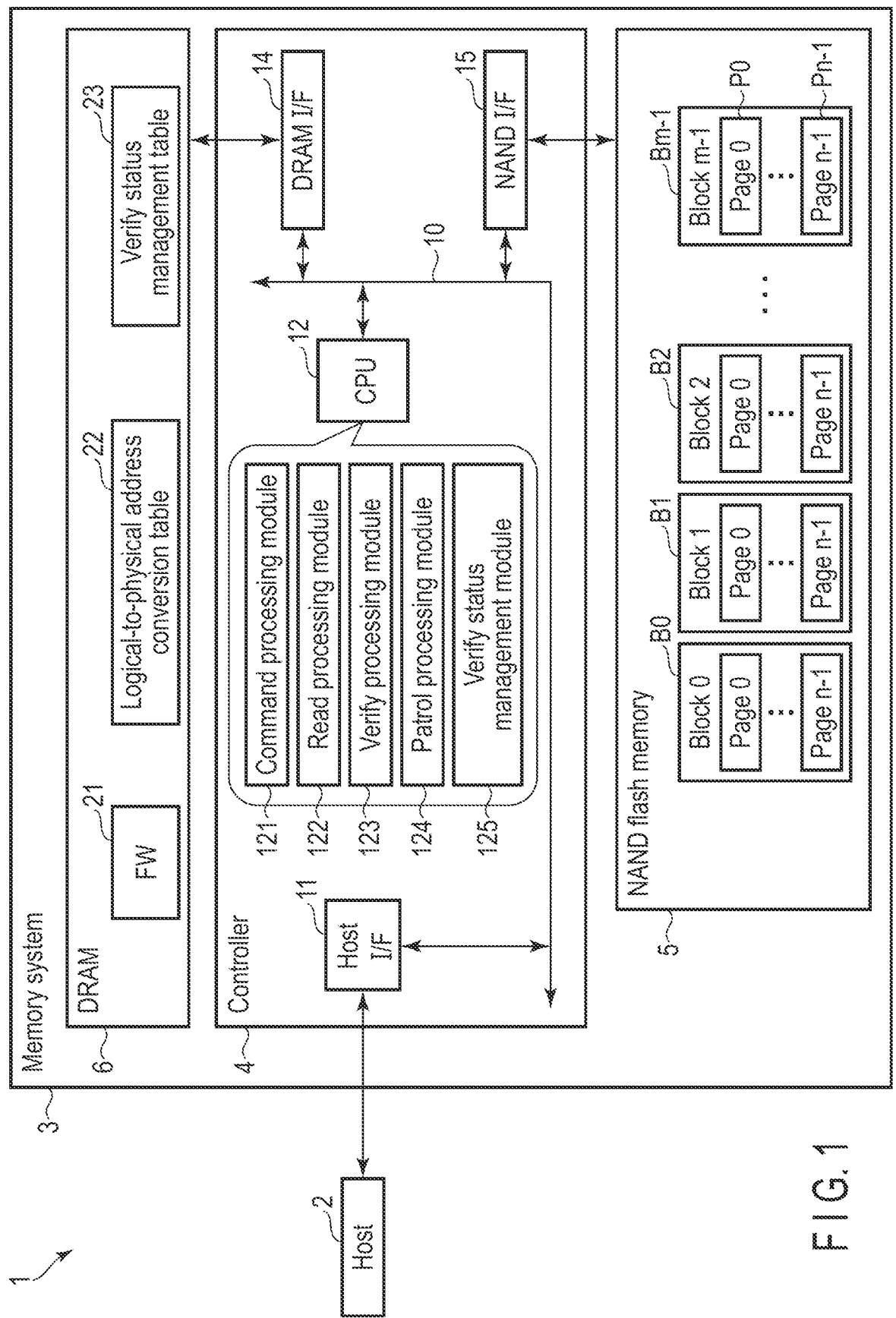
FIG. 1 is a block diagram illustrating a configuration example of an information processing system including a memory system according to a first embodiment.

First, a configuration of an information processing system including a memory system according to a first embodiment will be described. FIG. 1 illustrates a block diagram of the information processing system 1 which includes a host device 2 (hereinafter, referred to as host 2) and a memory system 3.

The host 2 is an information processing apparatus. The host 2 may be a storage server that stores a large amount of various data in the memory system 3, or may be a personal computer.

The memory system is a semiconductor storage device configured to write data to a nonvolatile memory, such as a NAND flash memory, and read data from the nonvolatile memory. The memory system is also referred to as a storage device. The memory system is realized, for example, as a solid state drive (SSD).

The memory system 3 may be used as a storage of the host 2. The memory system 3 may be built in the host 2 or may be externally connected to the host 2 via a cable wire or a wireless network.

An interface for connecting the host 2 and the memory system 3 conforms to a standard such as SCSI, Serial Attached SCSI (SAS), AT Attachment (ATA), Serial ATA (SATA), PCI Express (PCIe) (registered trademark), Ethernet (registered trademark), Fibre channel, or NVM Express (NVMe) (registered trademark).

The memory system 3 includes, for example, a controller 4, a NAND flash memory 5, and a RAM such as a dynamic random access memory (DRAM) 6. The controller 4 may be realized by a circuit such as a system-on-a-chip (SoC). The controller 4 may include a static random access memory (SRAM). Further, the DRAM 6 may be built in the controller 4.

A storage area of the DRAM 6 is allocated to a storage area of a firmware (FW) 21, a cache area of a logical-to-physical address conversion table 22, and a storage area of a verify status management table 23, for example.

The FW 21 is programs for controlling an operation of the controller 4. The FW 21 is loaded from the NAND flash memory 5 to the DRAM 6, for example.

The logical-to-physical address conversion table 22 manages mapping between each logical address and each physical address of the NAND flash memory 5. The logical address is an address used by the host 2 for addressing the memory system 3. The logical address is, for example, a logical block address (referred to as LBA). Hereinafter, in the first embodiment, a case where the LBA is used as the logical address will be mainly exemplified.

The verify status management table 23 manages information relating to a time in which data integrity of each LBA has been confirmed last. The data integrity of each LBA may be confirmed in accordance with a verify command from the host 2 or by a verify process accompanying a patrol process.

The verify status management table 23 manages, for example, (A) an elapsed time that has elapsed since data integrity of each LBA has been confirmed last or (B) a time (i.e. time point) at which data integrity of each LBA has been confirmed last. In the following description, the term "last confirmation time" is used to indicate (A) or (B).

FIG. 2 illustrates a configuration example of the logical-to-physical address conversion table 22. The logical-to-physical address conversion table 22 manages mapping between each LBA and each physical address of the NAND flash memory 5. The controller 4 may convert an LBA into a physical address using the logical-to-physical address conversion table 22. Further, the controller 4 may convert a physical address into an LBA using the logical-to-physical address conversion table 22.

In the example illustrated in FIG. 2, a physical address "X", a physical address "Y", and a physical address "Z" are mapped to an LBA "0", an LBA "1", and an LBA "2", respectively.

FIG. 3 illustrates a configuration example of the verify status management table 23. As illustrated, the verify status management table 23 may include plural entries that correspond to plural LBAs, respectively. Each of the entries includes an LBA field and a last confirmation time field.

In one entry corresponding to one LBA, the LBA field indicates the one LBA.

Further, the last confirmation time field indicates a last confirmation time of user data of the one LBA. For example, the time indicated in the last confirmation time field indicates an elapsed time that has elapsed since integrity of user data of the LBA has been confirmed last. This elapsed time is represented by, for example, a time in units of minutes. Further, the time indicated in the last confirmation time field may indicate a time (time point) at which integrity of the user data of the LBA has been confirmed last.

In the example illustrated in FIG. 3, an elapsed time that has elapsed since confirmation of integrity of user data of LBA "1" is one minute. Similarly, an elapsed time since confirmation of integrity of user data of LBA "100" is 14400 minutes. An elapsed time since confirmation of integrity of user data of LBA "101" is 108000 minutes.

An entry of the verify status management table 23 is added (generated) in a case where, for example, user data of the LBA has been written into the NAND flash memory 5. Alternatively, an entry of the verify status management table 23 may be added in a case where integrity of user data of the LBA has been first confirmed after the user data was written into the NAND flash memory 5.

Further, an entry of the verify status management table 23 may be deleted, for example, in a case where an unmap command designating the corresponding LBA has been received from the host 2. That is, an entry of the verify status management table 23 may be deleted in a case where the corresponding LBA is not associated with any physical address in the logical-to-physical address conversion table 22.

Note that a correspondence relationship between an LBA and a last confirmation time may be managed in various data structures such as a tree structure without being limited to the table.

The description will continue returning to FIG. 1. The NAND flash memory 5 includes multiple blocks B0 to Bm-1. Each of the blocks B0 to Bm-1 includes multiple pages (here, pages P0 to Pn-1). The blocks B0 to Bm-1 each function as a minimum unit of a data erase operation. A block may also be referred to as an erase block or a physical block. Each of the pages P0 to Pn-1 includes memory cells connected to a single word line. The pages P0 to Pn-1 each function as a unit of a data write operation and a data read operation. Note that a word line may function as a unit of a data write operation and a data read operation.

The tolerable maximum number of program/erase cycles (maximum number of P/E cycles) for each of the blocks B0 to Bm-1 is limited. One P/E cycle of a block includes a data erase operation to erase data stored in all memory cells in the block and a data write operation to write data in each page of the block.

The controller 4 functions as a memory controller configured to control the NAND flash memory 5.

The controller 4 may function as a flash translation layer (FTL) configured to execute data management and block management of the NAND flash memory 5. The data management executed by the FTL includes (1) management of mapping data indicative of relationship between each LBA and each physical address of the NAND flash memory 5, and (2) process to hide a difference between read/write operations executed in units of page and erase operations executed in units of block. The block management includes management of defective blocks, wear leveling, and GC.

Management of mapping between each LBA and each physical address is executed by using a logical-to-physical address conversion table 22. The controller 4 manages mapping between each LBA and each physical address with a certain management size by using the logical-to-physical address conversion table 22. A physical address corresponding to an LBA indicates a physical memory location in the NAND flash memory 5 to which data of the LBA is written. The controller 4 manages multiple storage areas, which are obtained by logically dividing the storage space of the NAND flash memory 5, using the logical-to-physical address conversion table 22. The storage areas correspond to LBAs, respectively. That is, each of the storage areas is identified by one LBA. The logical-to-physical address conversion table 22 may be loaded from the NAND flash memory 5 to the DRAM 6 when the memory system 3 is powered on.

Data write into one page is executable only once in a single P/E cycle. Thus, the controller 4 writes updated data corresponding to an LBA not to an original physical memory location in which previous data corresponding to the LBA is stored but to a different physical memory location. Then, the controller 4 updates the logical-to-physical address conversion table 22 to associate the LBA with the different physical memory location and to invalidate the previous data. Data to which the logical-to-physical address conversion table 22 refers (that is, data associated with an LBA) will be referred to as valid data. Furthermore, data not associated with any LBA will be referred to as invalid data. The valid data is data to possibly be read by the host 2 later. The invalid data is data not to be read by the host 2 anymore.

FIG. 4 illustrates an example of a data structure associated with an LBAx. The LBAx is any LBA in an LBA space managed by the controller 4. A data structure 50 associated with the LBAx is data that is logically stored in the LBAx.

The data structure 50 includes, for example, an LBA 51, user data 52, protection information (PI) 53, a cyclic redundancy check (CRC) code 54, and an error correction code (ECC) 55.

The LBA 51 is an LBA (LBAx) associated with this data structure 50. The user data 52 is user data received from the host 2 together with a write request that designates the LBAx.

The PI 53 is information for protecting the user data 52. The PI 53 may be received from the host 2 together with the write request and the user data 52 or may be generated by the controller 4. The PI 53 includes, for example, a Guard field 531, an Application Tag field 532, and a Reference Tag field 533.

The Guard field 531 includes a CRC code (for example, CRC-16) calculated for the user data 52. The Application Tag field 532 includes data that is not interpreted by the controller 4 and may be used to disable a check of the PI 53. The Reference Tag field 533 includes information for associating the user data 52 with an address. The Reference Tag field 533 includes, for example, at least a part of the LBA designated in the write request received together with the user data 52.

The CRC code 54 is a CRC code calculated for the user data 52 and the PI 53. The CRC code 54 is calculated by the controller 4. The CRC code 54 may be used to verify integrity of the user data 52 and the PI 53 that are read from the NAND flash memory 5.

The ECC 55 is an ECC calculated for the user data 52, the PI 53, and the CRC code 54. The ECC 55 is calculated by the controller 4. The ECC 55 may be used to correct errors in the user data 52, the PI 53, and the CRC code 54 that are read from the NAND flash memory 5.

Note that the data structure 50 may include either the PI 53 or the CRC code 54.

The description will continue returning to FIG. 1. The controller 4 may include a host interface (host I/F) 11, a CPU 12, a NAND I/F 13, and a DRAM interface (DRAM I/F) 14. The host I/F 11, the CPU 12, the NAND I/F 13, and the DRAM I/F 14 may be connected via a bus 10.

The host I/F 11 functions as a circuit that receives various commands, for example, I/O commands and various control commands from the host 2. The I/O commands may include a write command, a read command, and a verify command. The control commands may include an unmap command (trim command) and a format command. The format command is a command for unmapping all the LBAs in the memory system 3 entirely.

The NAND I/F 13 electrically connects the controller 4 and the NAND flash memory 5. The NAND I/F 13 conforms to an interface standard such as Toggle DDR and Open NAND Flash Interface (ONFI).

The NAND I/F 13 functions as a memory control circuit configured to control the NAND flash memory 5. The NAND I/F 13 may be connected to memory chips in the NAND flash memory 5 via multiple channels. By operating the memory chips in parallel, it is possible to broaden an access bandwidth to the NAND flash memory 5.

The DRAM I/F 14 functions as a DRAM control circuit configured to control accessing the DRAM 6. The storage area of the DRAM 6 is allocated to areas for storing the FW 21, the logical-to-physical address conversion table 22, the verify status management table 23, and the like, and a buffer area used as a read/write buffer.

The CPU 12 is a processor configured to control the host I/F 11, the NAND I/F 13, and the DRAM I/F 14. The CPU 12 performs various processes by executing the FW 21 loaded from the NAND flash memory 5 onto the DRAM 6. The FW 21 is control programs that include instructions for causing the CPU 12 to execute the various processes. The CPU 12 may execute command processing for processing various commands from the host 2 and the like. The operation of the CPU 12 is controlled by the FW 21 executed by the CPU 12.

The function of each unit in the controller 4 may be realized by a dedicated hardware in the controller 4 or may be realized by the CPU 12 executing the FW 21.

The CPU 12 functions as, for example, a command processing module 121, a read processing module 122, a verify processing module 123, a patrol processing module 124, and a verify status management module 125. The CPU 12 functions as these modules, for example, by executing the FW 21.

Incidentally, the memory system 3 (more specifically, the controller 4) and the host 2 may respectively perform processes for maintaining data written in the NAND flash memory 5. The memory system 3 periodically performs, for example, a patrol process. The host 2 periodically performs, for example, a scrubbing process.

Alternatively, the host 2 may transmit a verify command to the memory system 3. The verify command is a command for verifying integrity of user data stored in the NAND flash memory 5, and is defined in the NVMe standard, for example. The controller 4 of the memory system 3 reads data (for example, data structure 50) from the NAND flash memory 5 in accordance with the verify command, and verifies integrity of user data in the read data using information (for example, PI 53) included in the read data.

In processing in accordance with the verify command, the controller 4 does not transfer the read data to the host 2. Therefore, a bus band between the host 2 and the memory system 3 is unaffected. Further, it is unnecessary for the host 2 to process the read data.

In the memory system 3, however, not only the patrol process but also the processing in accordance with the verify command is performed in order to maintain the data written in the NAND flash memory 5. In both the patrol process and the processing in accordance with the verify command, access to the NAND flash memory 5 occurs. An increase in access to the NAND flash memory 5 causes wear of the NAND flash memory 5.

Therefore, in the memory system 3 of the embodiment, data is maintained while mitigating the wear of the NAND flash memory 5. Specifically, the controller 4 uses the verify status management table 23 to manage information relating to a last confirmation time of user data associated with each of the LBAs. The controller 4 controls a timing of performing a verify process using the last confirmation time of the user data of each LBA. Alternatively, the host 2 controls a transmission timing of a verify command using the last confirmation time of the user data of each LBA. As a result, the number of times of reading data from the NAND flash memory 5 can be reduced, and thus, data can be maintained while mitigating the wear of the NAND flash memory 5.

Specific operation examples in the memory system 3 will be described below.

FIG. 5 illustrates an example of an operation in accordance with a state inquiry command in the memory system 3. The state inquiry command is a command issued by the host 2 to inquire about a verify status of user data stored in the NAND flash memory 5.

Here, a last confirmation time managed in the verify status management table 23 will be described. The last confirmation time is determined using, for example, a timer provided in the verify status management module 125.

(A) In a case where a last confirmation time indicates an elapsed time that has elapsed since integrity of user data of each LBA has been confirmed last, as integrity of user data of an LBA is confirmed, zero is set in the verify status management table 23 as a last confirmation time associated with the LBA. The verify status management module 125 increases the set last confirmation time according to a lapse of time based on the timer, for example, periodically, until integrity of the user data of the LBA is confirmed next. When the integrity of the user data of the LBA is confirmed next, zero is set again as the last confirmation time associated with the LBA.

(B) In a case where a last confirmation time indicates a time at which integrity of user data of each LBA has been confirmed last, as integrity of user data of an LBA is confirmed, the current time acquired using the timer of the verify status management module 125 is set in the verify status management table 23 as a last confirmation time associated with the LBA. When the integrity of the user data of the LBA is confirmed next, the set last confirmation time is updated with the current time that is further acquired using the timer of the verify status management module 125.

The command processing module 121 receives a state inquiry command from the host 2 via the host I/F 11. In accordance with the received state inquiry command, the command processing module 121 acquires, for example, a last confirmation time corresponding to the oldest time from the verify status management table 23.

More specifically, in a case where a last confirmation time of the verify status management table 23 indicates an elapsed time that has elapsed since confirmation of integrity of user data of an LBA, the command processing module 121 acquires the maximum value from one or more last confirmation times included in the verify status management table 23. For example, in the verify status management table 23 illustrated in FIG. 3, the command processing module 121 acquires "108000" which is the maximum value among the three last confirmation times.

Then, the command processing module 121 transmits the acquired information indicative of the maximum last confirmation time to the host 2 via the host I/F 11.

As a result, the host 2 can acquire the maximum last confirmation time for the user data stored in the NAND flash memory 5. The host 2 can determine whether to transmit a verify command to the memory system 3 according to the acquired maximum last confirmation time.

For example, when the acquired maximum last confirmation time (elapsed time) exceeds a threshold, the host 2 determines that a verify command needs to be transmitted to the memory system 3. As a result, the host 2 can cause the memory system 3 to perform a verify process at an appropriate timing based on the maximum last confirmation time.

Further, when the acquired maximum last confirmation time is equal to or less than the threshold, the host 2 determines that it is unnecessary to transmit a verify command to the memory system 3 yet. As a result, the host 2 can control a frequency at which the verify process is performed by the memory system 3. Therefore, the number of times of access to the NAND flash memory 5 may be reduced.

The state inquiry command may designate an LBA. In such a case, the command processing module 121 transmits information relating to a last confirmation time corresponding to the designated LBA to the host 2.

Further, the state inquiry command may designate an LBA range. In such a case, the command processing module 121 transmits, to the host 2, information relating to a last confirmation time corresponding to each LBA in the designated LBA range or the maximum value among last confirmation times corresponding to the respective LBAs in the designated LBA range.

When the state inquiry command designates neither an LBA nor an LBA range, the command processing module 121 may transmit information relating to the maximum last confirmation time and an LBA or an LBA range corresponding to the maximum last confirmation time to the host 2.

Next, an operation of the memory system 3 when receiving a verify command from the host 2 will be described with reference to FIGS. 6 and 7. The verify command designates an LBA or an LBA range. The verify command is a command requesting verification of integrity of user data of the designated LBA or LBA range.

More specifically, the verify command includes a start LBA of data to be verified and the size of the data. The size of the data to be verified may be designated by, for example, the number of sectors. The sector is also referred to as a logical block.

Hereinafter, a case where a verify command designates one LBA will be mainly described in order to facilitate understanding of the description. Note that, in a case where a verify command designates an LBA range, an operation similar to that in the following description is performed for each LBA included in the LBA range.

Figure 6:
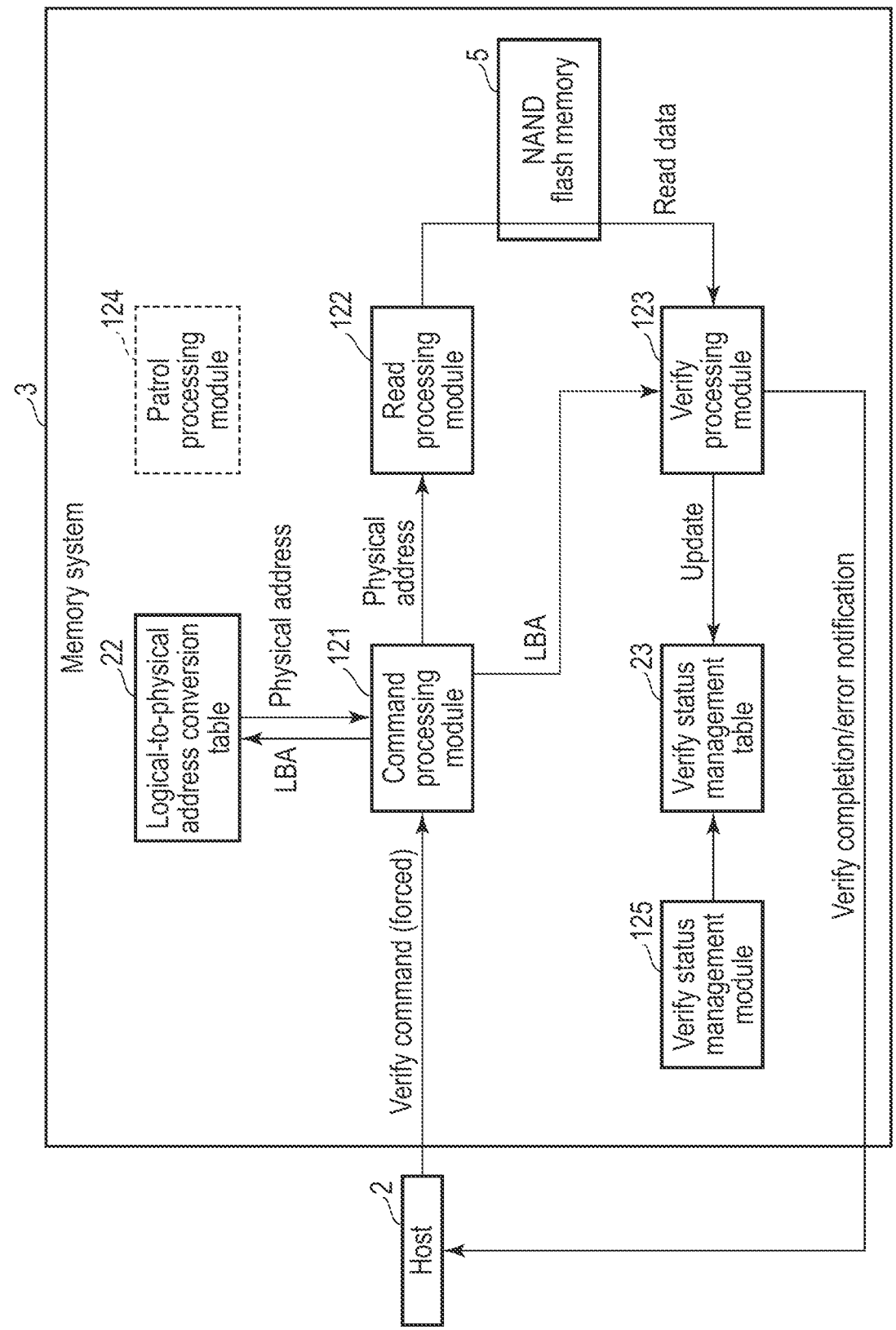
FIG. 6 is a block diagram illustrating an example of an operation in accordance with a forced verify command in the memory system of the first embodiment.

FIG. 6 illustrates an example of an operation in accordance with a first verify command in the memory system 3. In the memory system 3, integrity of user data of the designated LBA is verified in accordance with the first verify command. That is, the first verify command is a command that forces the memory system 3 to verify the integrity of the user data of the designated LBA. A specific operation will be described below. Hereinafter, the LBA designated in the first verify command is also referred to as a target LBA.

First, the command processing module 121 receives the first verify command from the host 2 via the host I/F 11. The command processing module 121 acquires a physical address corresponding to the target LBA using the logical-to-physical address conversion table 22. The command processing module 121 sends the acquired physical address to the read processing module 122. Further, the command processing module 121 sends the target LBA to the verify processing module 123.

The read processing module 122 reads data of the physical address from the NAND flash memory 5 using the physical address sent by the command processing module 121. Hereinafter, the data read by the read processing module 122 is also referred to as read data. Further, it is assumed that the read data has a configuration of the data structure 50 described above with reference to FIG. 4.

The read processing module 122 sends the read data to the verify processing module 123. The read processing module 122 may store the read data in the DRAM 6 (more specifically, a read buffer).

The verify processing module 123 verifies integrity of the user data 52 included in the read data. The verify processing module 123 verifies the integrity of the user data 52 using, for example, the PI 53 included in the read data.

Specifically, the verify processing module 123 calculates a CRC code of the user data 52 included in the read data. Then, the verify processing module 123 determines whether the calculated CRC code matches a CRC code included in the Guard field 531 of the PI 53. When the calculated CRC code matches the CRC code in the Guard field 531, the verify processing module 123 determines that the integrity of the user data 52 has been confirmed. When the calculated CRC code is different from the CRC code in the Guard field 531, the verify processing module 123 determines that the integrity of the user data 52 is not confirmed.

Note that, when the calculated CRC code matches the CRC code of the Guard field 531, the verify processing module 123 may further verify the integrity of the user data 52 using the LBA 51 included in the read data and the Reference Tag field 533 of the PI 53. When the LBA 51 included in the read data matches an LBA included in the Reference Tag field 533, the verify processing module 123 determines that the integrity of the user data 52 has been confirmed. When the LBA 51 included in the read data is different from the LBA included in the Reference Tag field 533, the verify processing module 123 determines that the integrity of the user data 52 is not confirmed. The verify processing module 123 may use the LBA designated in the first verify command, instead of the LBA 51 included in the read data.

Alternatively, the verify processing module 123 may verify the integrity of the user data 52 using the CRC code 54 included in the read data. For example, in a case where the PI 53 is not included in the read data, the verify processing module 123 verifies the integrity of the user data 52 using the CRC code 54.

Specifically, the verify processing module 123 calculates a CRC code for the user data 52 and the PI 53 that are included in the read data. Then, the verify processing module 123 determines whether the calculated CRC code matches the CRC code 54 included in the read data. When the calculated CRC code matches the CRC code 54 included in the read data, the verify processing module 123 determines that the integrity of the user data 52 has been confirmed. When the calculated CRC code is different from the CRC code 54 included in the read data, the verify processing module 123 determines that the integrity of the user data 52 is not confirmed.

When the integrity of the user data 52 has been confirmed, the verify processing module 123 updates the last confirmation time associated with the target LBA in the verify status management table 23. Then, the verify processing module 123 notifies the host 2 that the integrity of the user data 52 of the target LBA has been confirmed.

When the integrity of the user data 52 is not confirmed, the verify processing module 123 notifies the host 2 that the integrity of the user data 52 of the target LBA is not confirmed. When the integrity of the user data 52 is not confirmed, the verify processing module 123 does not update the last confirmation time associated with the target LBA in the verify status management table 23.

Note that the verify processing module 123 may determine whether PI is included in data associated with an LBA (for example, the data structure 50 associated with the LBAx), using, for example, a Metadata Size field of LBA Format Data Structure of NVMe. Specifically, when zero is set in the Metadata Size field, the verify processing module 123 determines that PI is not included in the data associated with the LBA. On the other hand, when a value other than zero is set in the Metadata Size field, the verify processing module 123 determines that PI is included in the data associated with the LBA.

Through the above operation, the memory system 3 can verify the integrity of the user data of the LBA (or the LBA range) designated in the first verify command.

Figure 7:
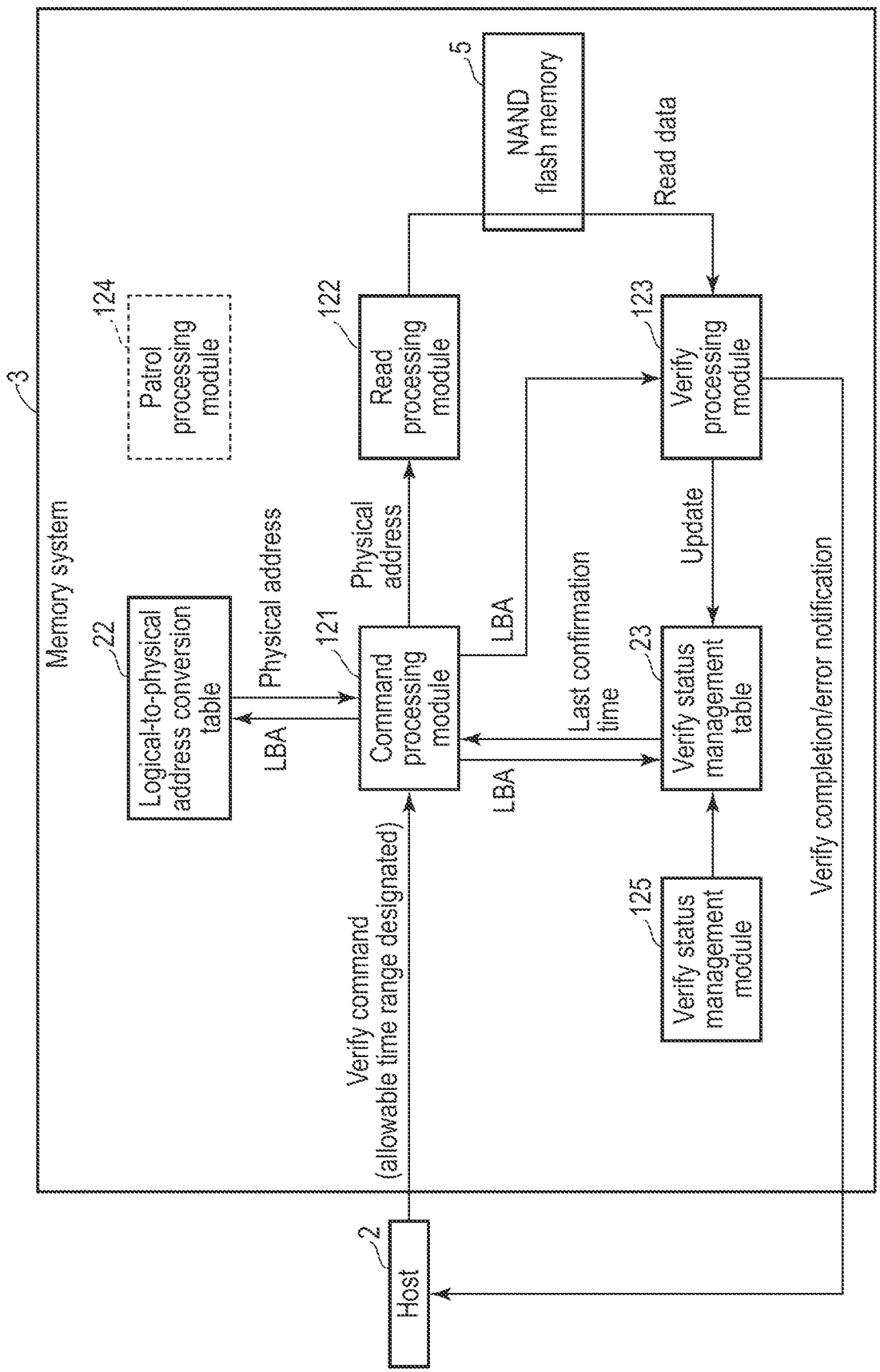
FIG. 7 is a block diagram illustrating an example of an operation in accordance with a verify command that designates an allowable time range in the memory system of the first embodiment.

FIG. 7 illustrates an example of an operation in accordance with a second verify command in the memory system 3. The second verify command designates an allowable time range in addition to an LBA or an LBA range. When the time at which integrity of user data of the designated LBA (or user data of each LBA in the designated LBA range) has been confirmed last is out of the allowable time range, the controller 4 verifies the integrity of the user data of the designated LBA in accordance with the second verify command. Further, when the time at which the integrity of the user data of the designated LBA has been confirmed last is within the allowable time range, the controller 4 does not verify the integrity of the user data of the designated LBA. That is, when the time at which the integrity of the user data of the designated LBA has been confirmed last is within the allowable time range, the controller 4 skips a verify operation for the designated LBA. A specific operation will be described below. Hereinafter, the LBA designated in the second verify command is also referred to as a target LBA.

First, the command processing module 121 receives the second verify command from the host 2 via the host I/F 11. The command processing module 121 acquires a last confirmation time associated with the target LBA from the verify status management table 23.

Next, the command processing module 121 determines whether the acquired last confirmation time is within the allowable time range designated in the second verify command.

When the acquired last confirmation time is within the allowable time range, the command processing module 121 performs control so as not to perform the operation of verifying the integrity of the user data of the target LBA. Specifically, the command processing module 121 does not send a physical address corresponding to the target LBA to the read processing module 122. Further, the command processing module 121 does not send the target LBA to the verify processing module 123. As a result, the read processing module 122 does not read data of the physical address corresponding to the target LBA from the NAND flash memory 5, and the verify processing module 123 does not verify the integrity of the user data of the target LBA. Therefore, the command processing module 121 skips the verify operation for the target LBA when the last confirmation time of the target LBA is within the allowable time range. Note that the command processing module 121 may notify the host 2 that the integrity of the user data of the target LBA has already been confirmed within the allowable time range.

On the other hand, when the acquired last confirmation time is out of the allowable time range, the command processing module 121 acquires the physical address corresponding to the target LBA using the logical-to-physical address conversion table 22. The command processing module 121 sends the acquired physical address to the read processing module 122. Further, the command processing module 121 sends the target LBA to the verify processing module 123. Subsequent operations performed by the read processing module 122 and the verify processing module 123 are described above with reference to FIG. 6. Therefore, the verify operation for the target LBA can be performed when the last confirmation time of the target LBA is out of the allowable time range.

Through the above operation, the memory system 3 can skip the verify operation for the target LBA when the last confirmation time of the user data of the target LBA is within the allowable time range. That is, in the case of using the second verify command designating the allowable time range, whether to perform the verify operation can be controlled in consideration of the last confirmation time associated with the target LBA. Therefore, for example, there is a possibility that the number of times of reading data from the NAND flash memory 5 can be reduced as compared with the case of using the first verify command that does not designate the allowable time range. Accordingly, the wear of the NAND flash memory 5 may be mitigated.

Next, a verify process performed on data read in a patrol process will be described.

FIG. 8 illustrates an example of the verify process accompanying the patrol process in the memory system 3. The patrol process is a process for detecting each block storing data in which the number of error bits exceeds a threshold among blocks included in the NAND flash memory 5. Each detected block is a target of refresh processing or GC, for example. As a result, valid data in each detected block can be rewritten into another block in the NAND flash memory 5.

As the time elapsed since writing of the data written in the NAND flash memory 5 increases, the possibility that an error occurs increases. Further, as the number of times of reading of the data written in the NAND flash memory 5 increases, the possibility that an error occurs increases. The controller 4 can detect the block storing data in which the number of error bits exceeds the threshold, for example, by performing the patrol process at regular time intervals.

Further, the verify process accompanying the patrol process is a verify process for data read in the patrol process. Since the data read in the patrol process is used in this case, it is unnecessary to read data from the NAND flash memory 5 again in order to perform the verify process. Therefore, the number of times of reading data from the NAND flash memory 5 can be reduced by performing the verify process in association with the patrol process. A specific operation will be described below.

First, the patrol processing module 124 determines a physical address to be read. The patrol processing module 124 reads data stored in the NAND flash memory 5 in a unit of a predetermined data length according to a specific order. More specifically, the patrol processing module 124 selects one block from blocks included in the NAND flash memory 5, for example, in the order of block numbers. Note that the patrol processing module 124 may skip selection of a block being accessed for writing. For example, the patrol processing module 124 determines a physical address to be read in order to sequentially read data in the unit of the predetermined data length from the start of a selected block. The patrol processing module 124 sends the determined physical address to be read to the read processing module 122. Hereinafter, the physical address to be read is also referred to as a target physical address. Note that the order in which data is read from the NAND flash memory 5 in the patrol process and the unit of data to be read are arbitrarily determined according to the specification of the NAND flash memory 5 or the like.

The patrol processing module 124 acquires an LBA (target LBA) corresponding to the target physical address using the logical-to-physical address conversion table 22. The patrol processing module 124 sends the acquired target LBA to the verify processing module 123.

The read processing module 122 reads data of the target physical address from the NAND flash memory 5 using the target physical address sent by the patrol processing module 124. Here, it is assumed that the data that has been read (read data) has the configuration of the data structure 50 described above with reference to FIG. 4.

The read processing module 122 sends the read data to the patrol processing module 124 and the verify processing module 123. The read processing module 122 may store the read data in the DRAM 6 (more specifically, a read buffer).

The patrol processing module 124 performs an error correction process using the ECC 55 included in the read data. When the number of bits in which errors have been corrected by the error correction process (that is, the number of ECC error bits) exceeds a threshold, the patrol processing module 124 sets the block storing the read data as a block to be refreshed or subjected to GC. As a result, valid data in the block to be refreshed or subjected to GC can be rewritten into another block in the refresh processing or the GC processing.

Further, the verify processing module 123 verifies integrity of the user data 52 included in the read data. The operation for verifying the integrity of the user data 52 by the verify processing module 123 is described above with reference to FIG. 6. When the integrity of the user data 52 has been confirmed, the verify processing module 123 updates a last confirmation time associated with the target LBA in the verify status management table 23. On the other hand, when the integrity of the user data 52 fails to be confirmed, the last confirmation time associated with the target LBA is not updated in the verify status management table 23.

Through the above operation, the data read from the NAND flash memory 5 in the periodic patrol process can also be used for the verify process in the memory system 3. As a result, the number of times of reading data from the NAND flash memory 5 can be reduced as compared with a case where the patrol process and the verify process are separately performed, such as a case where the patrol process is periodically performed and the verify process is further performed in accordance with a verify command. Therefore, data can be maintained while mitigating the wear of the NAND flash memory 5.

Note that there is a possibility that the amount of data of the verify status management table 23 becomes enormous in a case where a last confirmation time of user data is managed in units of LBAs.

For example, the host 2 determines that it is necessary to perform the verify process again on user data whose last confirmation time exceeds a specific limit value. Therefore, information of an entry including the last confirmation time exceeding the limit value in the verify status management table 23 is information unnecessary for the host 2. Therefore, the host 2 may transmit, for example, a command designating the limit value to the memory system 3. As a result, the host 2 can notify the memory system 3 that the information of the entry including the last confirmation time exceeding the designated limit value is unnecessary for the host 2.

The verify processing module 123 of the memory system 3 trims down the verify status management table 23 according to the limit value of the last confirmation time designated in the command. That is, the verify processing module 123 deletes the entry, which includes the last confirmation time exceeding the limit value designated in the command, from the verify status management table 23.

Specifically, for example, in the verify status management table 23 illustrated in FIG. 3, an elapsed time that has elapsed since confirmation of integrity of user data of an LBA is indicated as the last confirmation time. In this case, in accordance with, for example, the command in which 100000 is designated as a limit value, the verify processing module 123 deletes an entry of the LBA 101 that includes the last confirmation time (108000) exceeding the limit value from the verify status management table 23.

As a result, the size of an area in the DRAM 6 provided for storing the verify status management table 23 can be reduced.

Note that the host 2 may transmit a command, which indicates release of the designation of the limit value of the last confirmation time, to the memory system 3. In accordance with this command, the verify processing module 123 of the memory system 3 stops the trimming of the verify status management table 23.

Figure 9:
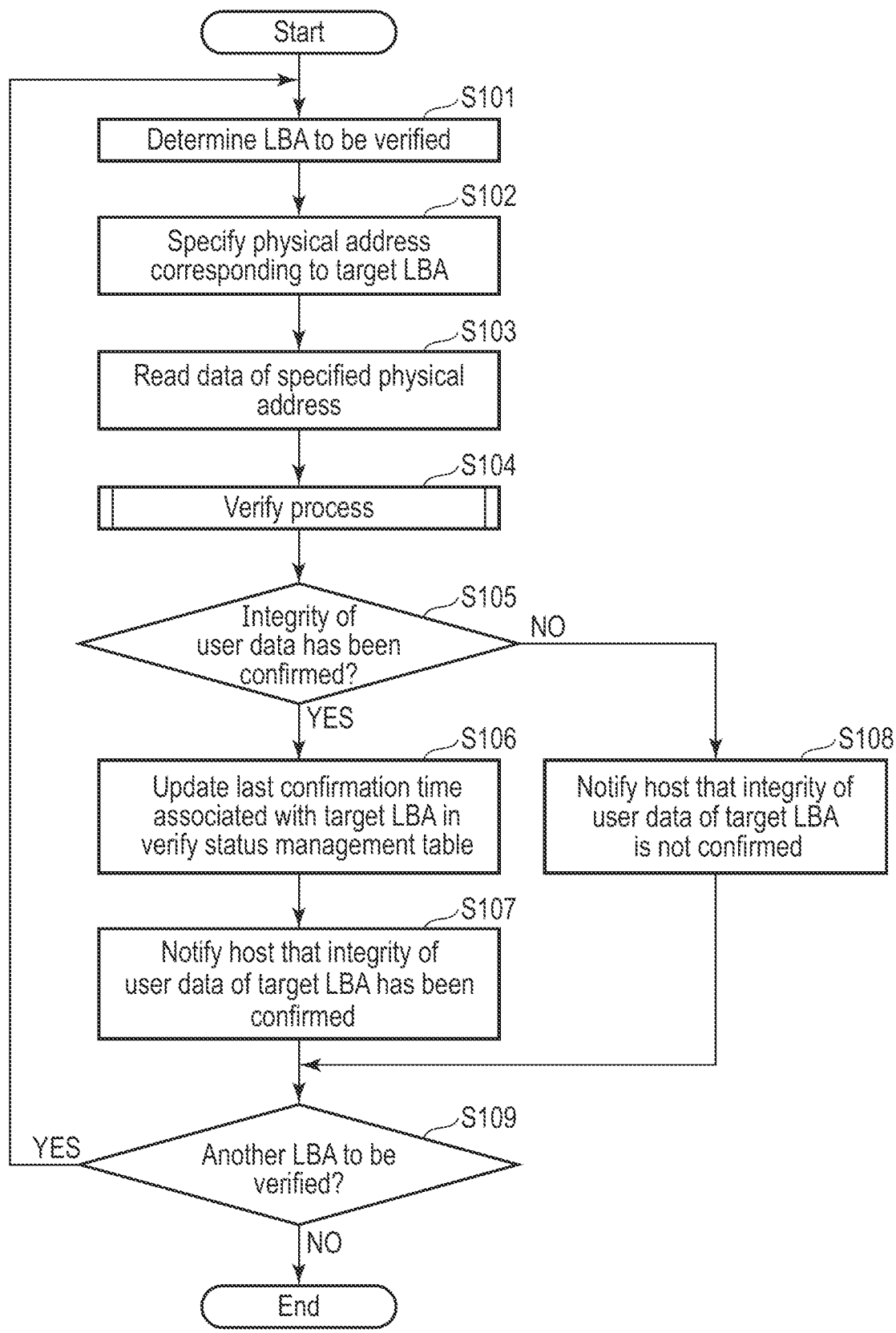
FIG. 9 is a flowchart illustrating an example of the procedure of a verify command process executed in the memory system of the first embodiment.

FIG. 9 is a flowchart illustrating an example of the procedure of a verify command process. The CPU 12 executes the verify command process in accordance with reception of a forced verify command (first verify command) from the host 2. Here, a case where a verify command designates an LBA range on which a verify process is to be performed will be exemplified.

As illustrated in the flowchart the CPU 12 determines an LBA to be verified (step S101). The LBA to be verified is an LBA within the LBA range that is designated in the verify command. The determined LBA to be verified is also referred to as a target LBA.

The CPU 12 specifies a physical address corresponding to the target LBA using the logical-to-physical address conversion table 22 (step S102). Then, the CPU 12 reads data of the specified physical address from the NAND flash memory 5 (step S103). The data to be read is data of a predetermined length.

Next, the CPU 12 performs a verify process using the read data (step S104). The verify process is a process for verifying integrity of user data included in the read data. As a result of the verify process, the CPU 12 obtains, for example, either information indicating that the integrity of the user data has been confirmed or information indicating that the integrity of the user data is not confirmed. A specific procedure of the verify process will be described later with reference to a flowchart of FIG. 10.

The processing of the CPU 12 branches according to the result of the verify process (step S105).

Specifically, when the result of the verify process indicates that the integrity of the user data has been confirmed (YES in step S105), the CPU 12 updates a last confirmation time associated with the target LBA in the verify status management table 23 (step S106). For example, in a case where the last confirmation time indicates an elapsed time that has elapsed since confirmation of the integrity of the user data, the CPU 12 sets zero as the last confirmation time associated with the target LBA. In this case, the last confirmation time in the verify status management table 23 is configured to increase with a lapse of time. Alternatively, the CPU 12 may set the current time as the last confirmation time associated with the target LBA. Then, the CPU 12 notifies the host 2 that the integrity of the user data of the target LBA has been confirmed (step S107), and the processing of the CPU 12 proceeds to step S109. Note that the CPU 12 may collectively notify the host 2 of verification results regarding user data of all LBAs included in the LBA range designated in the verify command.

When the result of the verify process indicates that the integrity of the user data is not confirmed (NO in step S105), the CPU 12 notifies the host 2 that the integrity of the user data of the target LBA is not confirmed (step S108), and the processing of the CPU 12 proceeds to step S109. That is, when the integrity of the user data is not confirmed, the CPU 12 does not update the last confirmation time associated with the target LBA in the verify status management table 23.

Next, the CPU 12 determines whether there is another LBA to be verified (step S109). That is, the CPU 12 determines whether an LBA for which the verify process for user data has not yet been performed remains in the LBA range designated in the verify command.

When there is another LBA to be verified (YES in step S109), the processing of the CPU 12 returns to step S101 and performs the process for the other LBA.

On the other hand, when there is no other LBA to be verified (NO in step S109), that is, when the verify process on the user data of all the LBAs within the LBA range designated in the verify command is completed, the CPU 12 ends the verify command process.

Through the verify command process described above, the CPU 12 may update the verify status management table 23. Specifically, the CPU 12 verifies the integrity of the user data of each LBA within the LBA range designated in the verify command. Then, the CPU 12 updates the last confirmation time associated with the LBA of the user data whose integrity has been confirmed. As a result, the last confirmation time of the integrity of the user data stored in each LBA can be managed in the memory system 3.

FIG. 10 is the flowchart illustrating an example of the procedure of the verify process executed by the CPU 12. The verify process is a process for verifying integrity of user data. The verify process corresponds to, for example, step S104 of the verify command process described above with reference to FIG. 9. Here, a case where the CPU 12 performs the verify process using data of a target LBA read from the NAND flash memory 5 (read data) will be exemplified. Further, a case where the read data includes user data 52, PI 53, and an LBA 51 will be exemplified.

As illustrated in the flowchart, the CPU 12 calculates a CRC code using the user data 52 (step S201). Then, the CPU 12 determines whether the calculated CRC code matches a CRC code in the Guard field 531 included in the PI 53 (step S202).

When the calculated CRC code is different from the CRC code in the Guard field 531 (NO in step S202), the CPU 12 generates a verification result indicating that the integrity of the user data 52 is not confirmed (step S203), and ends the verify process.

When the calculated CRC code matches the CRC code in the Guard field 531 (YES in step S202), the CPU 12 determines whether the LBA 51 in the read data matches an LBA in the Reference Tag field 533 included in the PI 53 (step S204). Note that the CPU 12 may determine whether the target LBA matches the LBA in the Reference Tag field 533.

When the LBA 51 in the read data matches the LBA in the Reference Tag field 533 included in the PI 53 (YES in step S204), the CPU 12 generates a verification result indicating that the integrity of the user data 52 has been confirmed (step S205), and ends the verify process.

On the other hand, when the LBA 51 in the read data is different from the LBA in the Reference Tag field 533 included in the PI 53 (NO in step S204), the CPU 12 generates the verification result indicating that the integrity of the user data 52 is not confirmed (step S203), and ends the verify process.

Through the above verify process, the CPU 12 can verify the integrity of the user data 52 using the PI 53. Note that the processing of step S204 for comparing the LBA 51 in the read data with the LBA in the Reference Tag field 533 may be omitted.

Further, in a case where the PI 53 is not included in the read data, the CPU 12 may verify the integrity of the user data 52 using information equivalent to the PI 53 included in the read data (for example, the CRC code 54). Specifically, the CPU 12 calculates a CRC code using the user data 52, and determines whether the calculated CRC code matches the CRC code 54 in the read data. When the calculated CRC code matches the CRC code 54 in the read data, the CPU 12 generates a verification result indicating that the integrity of the user data 52 has been confirmed. On the other hand, when the calculated CRC code is different from the CRC code 54 in the read data, the CPU 12 generates a verification result indicating that the integrity of the user data 52 is not confirmed.

Figure 11:
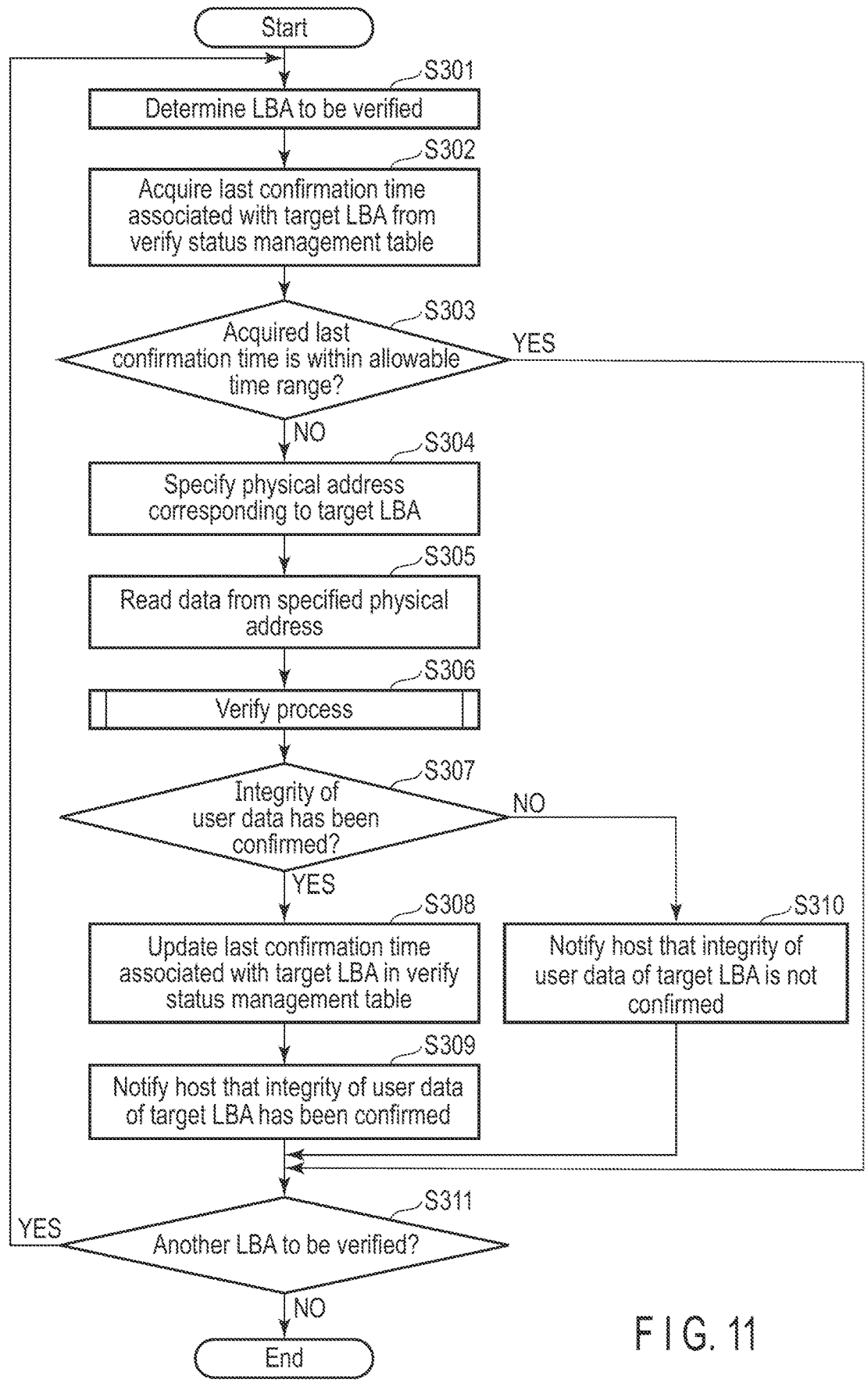
FIG. 11 is a flowchart illustrating another example of the procedure of the verify command process executed in the memory system of the first embodiment.

FIG. 11 is a flowchart illustrating another example of the procedure of the verify command process. The CPU 12 executes the verify command process in accordance with reception of a verify command designating an allowable time range (second verify command) from the host 2. Here, a case where a verify command designates an LBA range for which a verify process is to be performed will be exemplified.

As illustrated in the flowchart, the CPU 12 determines an LBA to be verified (target LBA) (step S301). The CPU 12 acquires a last confirmation time associated with the target LBA from the verify status management table 23 (step S302).

The CPU 12 determines whether the acquired last confirmation time is within the allowable time range designated in the verify command (step S303).

When the acquired last confirmation time is out of the allowable time range (NO in step S303), the CPU 12 performs, according to processing from step S304 to step S310, processing for verifying integrity of user data of the target LBA and notifying the host 2 of the verification result. Since the processing from step S304 to step S310 is similar to the processing from step S102 to step S108 of the verify command process described above with reference to FIG. 9, the description thereof will be omitted. Then, the CPU 12 determines whether there is another LBA to be verified (step S311). When there is another LBA to be verified (YES in step S311), the processing of the CPU 12 returns to step S301 and performs the process for the other LBA. On the other hand, when there is no other LBA to be verified (NO in step S311), the CPU 12 ends the verify command process.

When the acquired last confirmation time is within the allowable time range (YES in step S303), the CPU 12 determines whether there is another LBA to be verified (step S311). When there is another LBA to be verified (YES in step S311), the processing of the CPU 12 returns to step S301 and performs the process for the other LBA. On the other hand, when there is no other LBA to be verified (NO in step S311), the CPU 12 ends the verify command process. That is, when the acquired last confirmation time is within the allowable time range, the CPU 12 may perform the processing for the other LBA without performing the processing for verifying the integrity of the user data of the target LBA. When the acquired last confirmation time is within the allowable time range, the CPU 12 may notify the host 2 that the integrity of the user data of the target LBA has already been confirmed at the time within the allowable time range.

Through the verify command process described above, the CPU 12 may update the verify status management table 23 when the last confirmation time corresponding to the target LBA is out of the allowable time range. As a result, the last confirmation time of the user data stored in each LBA can be managed in the memory system 3.

When the last confirmation time corresponding to the target LBA is within the allowable time range, the CPU 12 does not perform the verify process for verifying the integrity of the user data of the target LBA. That is, the CPU 12 does not perform the verify process on the LBA for which the integrity of the user data has been confirmed within the allowable time range. In this manner, the CPU 12 may reduce the number of times of reading the user data of each LBA from the NAND flash memory 5 by using the last confirmation time recorded in the verify status management table 23. Therefore, the wear of the NAND flash memory 5 can be mitigated.

FIG. 12 is a flowchart illustrating an example of the procedure of a verify process accompanying a patrol process. The verify process and the patrol process are executed by the CPU 12. The CPU 12 performs these processes, for example, at regular time intervals.

As illustrated in the flowchart, the CPU 12 performs the patrol process on the NAND flash memory 5 in processing from step S401 to step S406.

Specifically, the CPU 12 determines a physical address to be read (step S401). In the patrol process, the CPU 12 reads data stored in the NAND flash memory 5 in a unit of a predetermined data length according to a specific order. The CPU 12 determines a physical address to be read in order to read data in the unit of the predetermined data length according to the specific order. Hereinafter, the determined physical address to be read is also referred to as a target physical address.

The CPU 12 reads data of the target physical address from the NAND flash memory 5 (step S402). Then, the CPU 12 specifies an LBA corresponding to the target physical address using the logical-to-physical address conversion table 22 (step S403).

The CPU 12 determines whether the LBA corresponding to the target physical address has been specified (step S404). In other words, the CPU 12 determines whether the read data of the target physical address is valid data or invalid data.

When the LBA corresponding to the target physical address fails to be specified (NO in step S404), that is, when the read data is invalid data, the processing of the CPU 12 proceeds to step S411. The CPU 12 proceeds to processing for subsequent data without processing the read data that is invalid data.

When the LBA corresponding to the target physical address has been specified (YES in step S404), that is, when the read data is valid data, the CPU 12 performs an error correction process using the ECC 55 on the read data (step S405). The CPU 12 determines whether the number of bits in which errors have been corrected in the error correction process exceeds a threshold (step S406). When the number of bits in which the errors have been corrected in the error correction process exceeds the threshold (YES in step S406), the CPU 12 sets a block storing the read data as a block to be refreshed or subjected to GC (step S407), and the processing of the CPU 12 proceeds to step S408. In the refresh processing or GC processing, the valid data in the block to be refreshed or subjected to GC is written into another block. On the other hand, when the number of bits in which the errors have been corrected in the error correction process is the threshold or less (NO in step S406), the processing of the CPU 12 proceeds to step S408.

Next, the CPU 12 performs a verify process using the read data (step S408). The verify process is a process for verifying integrity of the user data 52 included in the read data. The specific procedure of the verify process is described above with reference to the flowchart of FIG. 10. Since the read data is data that has been already read in step S402 for the patrol process, the CPU 12 does not need to read data from the NAND flash memory 5 again in order to perform the verify process.

The processing of the CPU 12 branches according to the result of the verify process (step S409).

Specifically, when the result of the verify process indicates that the integrity of the user data has been confirmed (YES in step S409), the CPU 12 updates a last confirmation time, which is associated with the LBA (target LBA) specified in step S403, in the verify status management table 23 (step S410), and the processing of the CPU 12 proceeds to step S411.

When the result of the verify process indicates that the integrity of the user data is not confirmed (NO in step S409), the processing of the CPU 12 proceeds to step S411. That is, when the integrity of the user data is not confirmed, the CPU 12 does not update the last confirmation time associated with the target LBA in the verify status management table 23.

Next, the CPU 12 determines whether the patrol process for all the data in the NAND flash memory 5 has been completed (step S411). That is, the CPU 12 determines whether data that has not yet been read in the patrol process remains in the blocks of the NAND flash memory 5.

When the patrol process for all the data has not been completed (NO in step S411), the processing of the CPU 12 returns to step S401, and the patrol process for data that has not been read is performed.

When the patrol process for all the data has been completed (YES in step S411), the CPU 12 ends the patrol process and the verify process.

As described, through the patrol process and the verify process (steps S401 to S411), the CPU 12 can also perform the verify process on the data read in the patrol process. As a result, the CPU 12 can reduce the number of times of reading data from the NAND flash memory 5 as compared with a case where the patrol process and the verify process are separately performed. Therefore, data can be maintained while mitigating the wear of the NAND flash memory 5.

(Second Embodiment) FIG. 13 to FIG. 21

In the first embodiment, a verify status of data is managed in units of logical addresses (for example, in units of LBAs). On the contrary, according to a second embodiment, a verify status of data is managed in units of zones. Thus, the second embodiment is different from the first embodiment only in terms of a configuration for managing a verify status for each zone.

That is, a configuration of a memory system of the second embodiment is basically similar to that of the memory system 3 of the first embodiment except for managing the verify status for each zone. So hereinafter, the difference from the first embodiment will be mainly described.

The memory system 3, according to the second embodiment, uses zones, for example, Zoned Namespaces (ZNS) defined in the NVMe standard as a method for managing data stored in a NAND flash memory 5 in units of zones, as illustrated in FIG. 14.

The ZNS will be described with reference to FIG. 13. The whole of an LBA space used by a host 2 for accessing the memory system 3 may be divided into multiple subspaces. Each of the subspaces is sometimes referred to as a namespace. In the ZNS, an LBA space corresponding to a namespace may be divided into a set of zones. Each of the zones may include multiple LBAs. Each of the zones, which is obtained by dividing the namespace, corresponds to an LBA range that is composed of contiguous and non-overlapping LBAs. Each zone is used as a unit for accessing the NAND flash memory 5.

In the example illustrated in FIG. 13, the namespace corresponds to z LBAs of LBA0 to LBA(z-1) and includes x zones of zone0 to zone(x-1). LBA0 is the lowest LBA of the zone0. Further, the LBA(z-1) is the highest LBA of the zone(x-1).

Writing in a zone is sequentially executed. A zone may correspond to an arbitrary physical unit in the NAND flash memory 5. For example, a zone corresponds to a block in the NAND flash memory 5. In this case, the block is accessed using contiguous LBAs included in an LBA range allocated to the zone.

FIG. 14 illustrates a configuration example of an information processing system 1 including the memory system 3 according to the second embodiment. A DRAM 6 includes a storage area of an FW 21, a cache area of a zone-to-physical address conversion table 25, and a storage area of a verify status management table 23. That is, in the memory system 3 of the second embodiment, the zone-to-physical address conversion table 25 is used instead of the logical-to-physical address conversion table 22 used in the memory system 3 of the first embodiment.

The DRAM 6 may further include a storage area of a zone descriptor 26. The zone descriptor 26 includes information indicative of a configuration and a state of each zone. The zone descriptor 26 corresponding to a zone includes, for example, information such as a start LBA of the zone (that is, the lowest LBA) and the writable capacity of the zone.

FIG. 15 illustrates a configuration example of the zone-to-physical address conversion table 25. The zone-to-physical address conversion table 25 manages mapping between each zone and each physical address of the NAND flash memory 5. In the zone-to-physical address conversion table 25, a zone is represented by, for example, a start LBA of an LBA range allocated to the zone.

In the example illustrated in FIG. 15, a physical address "X", a physical address "Y", and a physical address "Z" are mapped to a zone "0", a zone "1", and a zone "2", respectively.

A controller 4 manages multiple storage areas obtained by logically dividing the storage space of the NAND flash memory 5 using the zone-to-physical address conversion table 25. The storage areas correspond to zones, respectively. Each of the zones is specified by, for example, a start LBA in an LBA range allocated to that zone.

FIG. 16 illustrates a configuration example of the verify status management table 23. The verify status management table 23 may include entries corresponding to start LBAs of the respective zones. Each entry includes an LBA field and a last confirmation time field.

In an entry corresponding to a zone, the LBA field indicates a start LBA of an LBA range allocated to the zone.

Further, the last confirmation time field indicates a time in which integrity of user data of the zone has been confirmed last. The time indicated in the last confirmation time field indicates, for example, (A) an elapsed time that has elapsed since the integrity of user data in the corresponding zone has been confirmed last. The elapsed time is represented by, for example, a time in units of minutes. Further, the time indicated in the last confirmation time field may indicate (B) a time (time point) at which the integrity of the user data in the corresponding zone has been confirmed last. In the following description, the term last confirmation time is used to indicate (A) or (B).

In the example illustrated in FIG. 16, an elapsed time that has elapsed since confirmation of integrity of user data in a zone "1" is one minute. Similarly, an elapsed time since confirmation of integrity of user data of a zone "100" is 14400 minutes. An elapsed time since confirmation of integrity of user data of a zone "101" is 108000 minutes.

Note that the last confirmation time may be included in the zone descriptor 26, instead of using the verify status management table 23.

Next, operations of a command processing module 121, a read processing module 122, a verify processing module 123, a patrol processing module 124, and a verify status management module 125 in a case where a verify status is managed for each zone will be exemplified.

First, a last confirmation time managed in the verify status management table 23 will be described. The last confirmation time is determined using, for example, a timer provided in the verify status management module 125.

(A) In a case where a last confirmation time indicates an elapsed time that has elapsed since integrity of user data of each zone has been confirmed last, as the integrity of user data of a zone has been confirmed, zero is set in the verify status management table 23 as a last confirmation time associated with the zone. The verify status management module 125 increases the set last confirmation time according to a lapse of time based on the timer until integrity of the user data of the zone is confirmed next, for example, periodically. When the integrity of the user data of the zone is confirmed next, zero is set again as the last confirmation time associated with the zone.

(B) In a case where a last confirmation time indicates a time at which integrity of user data of each zone has been confirmed last, as the integrity of data of a certain zone has been confirmed, the current time acquired using the timer of the verify status management module 125 is set in the verify status management table 23 as a last confirmation time associated with the zone. When the integrity of the data of the zone is confirmed next, the set last confirmation time is updated with the current time that is further acquired using the timer of the verify status management module 125.

An operation of the memory system 3 when receiving a verify command from the host 2 will be described with reference to FIGS. 17 and 18. Hereinafter, a case where a verify command designates an LBA range allocated to a zone will be mainly described in order to facilitate understanding of the description. As described above, the verify command includes a start LBA of data to be verified and the size of the data. Here, the start LBA designated in the verify command corresponds to a start LBA of the zone. Therefore, the start LBA designated in the verify command is used as information for identifying the zone. Note that, in a case where a verify command designates an LBA range across multiple zones, an operation similar to that in the following description is performed for each LBA range corresponding to a zone.

Figure 17:
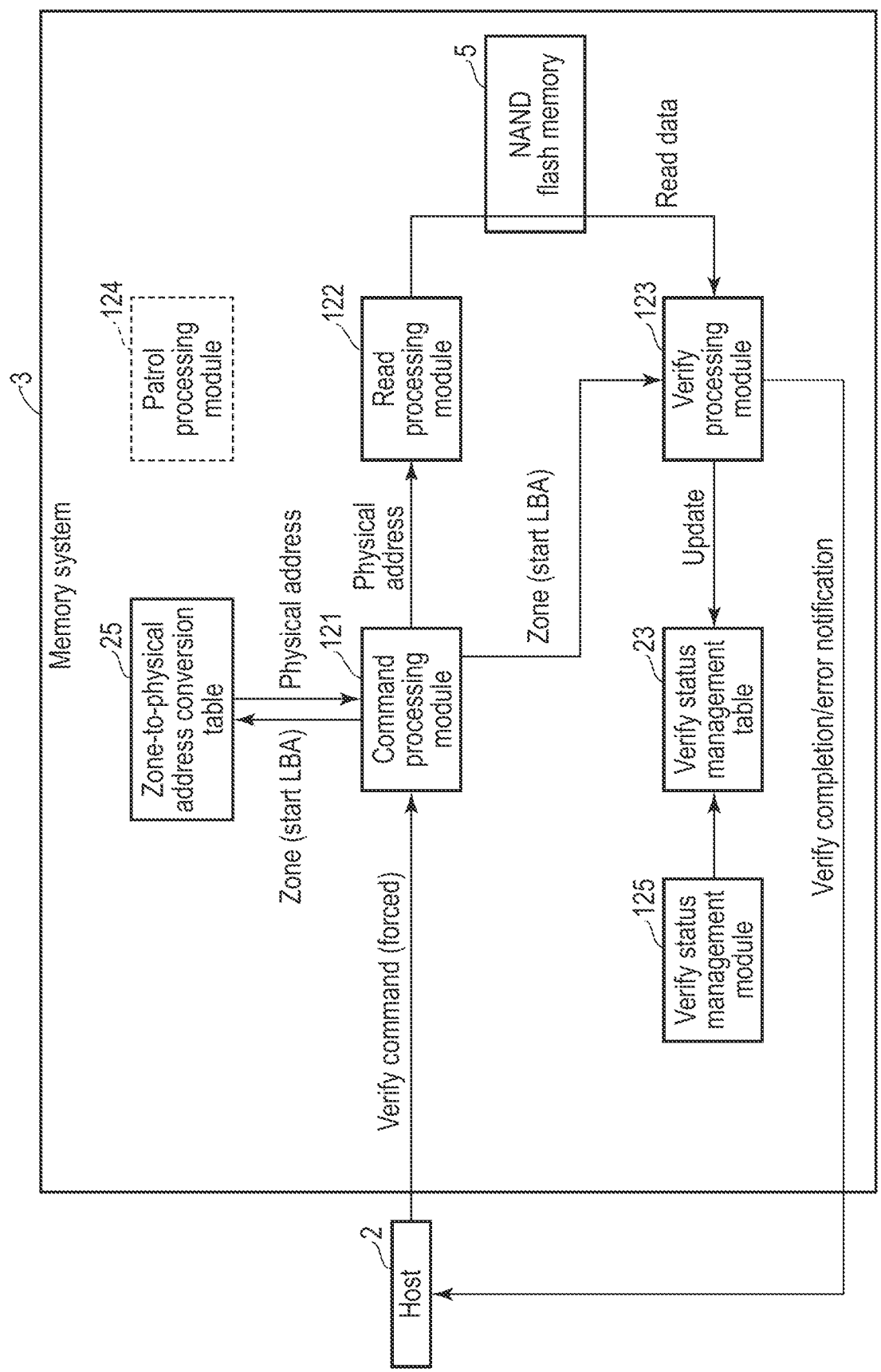
FIG. 17 is a block diagram illustrating an example of an operation in accordance with a forced verify command in the memory system of the second embodiment.

FIG. 17 illustrates an example of an operation in accordance with a first verify command in the memory system 3. In accordance with the first verify command, the controller 4 of the memory system 3 verifies integrity of user data in a zone corresponding to a designated LBA range. A specific operation will be described below. Hereinafter, the zone identified by a start LBA designated in the first verify command is also referred to as a target zone.

First, the command processing module 121 receives the first verify command from the host 2 via the host I/F 11. The command processing module 121 acquires a physical address corresponding to the start LBA designated in the received first verify command using the zone-to-physical address conversion table 25. The command processing module 121 sends the acquired physical address (target physical address) to the read processing module 122. Further, the command processing module 121 sends the start LBA designated in the first verify command to the verify processing module 123.

The read processing module 122 reads data of the physical address from the NAND flash memory 5 using the physical address sent by the command processing module 121. For example, when the target zone corresponds to a block specified by the target physical address in the NAND flash memory 5, the read processing module 122 may read data in the block sequentially from the start in a unit of a predetermined data length. Hereinafter, data of a predetermined data length unit read by the read processing module 122 is also referred to as read data. Further, it is assumed that the read data has a configuration of the data structure 50 described above with reference to FIG. 4.

The read processing module 122 sends the read data to the verify processing module 123. The read processing module 122 may store the read data in the DRAM 6 (more specifically, a read buffer).

The verify processing module 123 verifies integrity of the user data 52 included in the read data. An operation for verifying the integrity of the user data 52 by the verify processing module 123 is similar to that described in the first embodiment. For example, the verify processing module 123 verifies the integrity of all the user data in the target zone by sequentially processing the read data of the predetermined data length unit sent by the read processing module 122. All the user data in a zone is user data of all LBAs included in an LBA range allocated to the zone.

When the integrity of all the user data in the target zone has been confirmed, the verify processing module 123 updates the last confirmation time associated with the start LBA in the verify status management table 23. Then, the verify processing module 123 notifies the host 2 that the integrity of the user data in the designated LBA range (that is, zone) has been confirmed.

Further, when the integrity of at least part of the user data in the target zone is not confirmed, the verify processing module 123 does not update the last confirmation time associated with the start LBA in the verify status management table 23. Then, the verify processing module 123 notifies the host 2 that the integrity of the user data in the designated LBA range (zone) is not confirmed.

Through the above operation, the memory system 3 can verify the integrity of the user data in the LBA range (zone) designated in the first verify command.

FIG. 18 illustrates an example of an operation in accordance with a second verify command in the memory system 3. The second verify command designates an LBA range and an allowable time range. When a time at which integrity of user data in a zone corresponding to the designated LBA range has been confirmed last is out of the allowable time range, the controller 4 verifies the integrity of the user data in the zone in accordance with the second verify command. Further, when the time at which the integrity of the user data in the zone corresponding to the designated LBA range has been confirmed last is within the allowable time range, the controller 4 does not verify the integrity of the user data in the zone. That is, when the time at which the integrity of the user data in the zone corresponding to the designated LBA range has been confirmed last is within the allowable time range, the controller 4 skips a verify operation for the zone. A specific operation will be described below. Hereinafter, the zone identified by the start LBA designated in the second verify command is also referred to as a target zone.

First, the command processing module 121 receives the second verify command from the host 2 via the host I/F 11. The command processing module 121 acquires a last confirmation time associated with the target zone from the verify status management table 23 using the start LBA designated in the second verify command.

Next, the command processing module 121 determines whether the acquired last confirmation time is within the allowable time range designated in the second verify command.

When the acquired last confirmation time is within the allowable time range, the command processing module 121 performs control so as not to perform the operation of verifying integrity of user data of the target zone. Specifically, the command processing module 121 does not send a physical address corresponding to the target zone (for example, the physical address corresponding to the start LBA) to the read processing module 122. Further, the command processing module 121 does not send the start LBA for identifying the target zone to the verify processing module 123. As a result, the read processing module 122 does not read data of the physical address, which corresponds to the target zone, from the NAND flash memory 5, and the verify processing module 123 does not verify the integrity of the user data of the target zone. Therefore, the command processing module 121 skips the verify operation for the target zone when the last confirmation time of the target zone is within the allowable time range. Note that the command processing module 121 may notify the host 2 that the integrity of the user data of the target zone has already been confirmed within the allowable time range.

On the other hand, when the acquired last confirmation time is out of the allowable time range, the command processing module 121 acquires the physical address corresponding to the start LBA using the zone-to-physical address conversion table 25. The command processing module 121 sends the acquired physical address to the read processing module 122. Further, the command processing module 121 sends the start LBA to the verify processing module 123. Subsequent operations performed by the read processing module 122 and the verify processing module 123 are described above with reference to FIG. 17. Therefore, the verify operation for the target zone can be performed when the last confirmation time of the target zone is out of the allowable time range.

Through the above operation, the memory system 3 can skip the verify operation for the target zone when the last confirmation time of the entire user data of the target zone is within the allowable time range. That is, in the case of using the second verify command designating the allowable time range, whether to perform the verify operation can be controlled in consideration of the last confirmation time associated with the target zone. Therefore, for example, there is a possibility that the number of times of reading data from the NAND flash memory 5 can be reduced as compared with the case of using the first verify command that does not designate the allowable time range. Accordingly, the wear of the NAND flash memory 5 may be mitigated.

Note that an operation in accordance with a state inquiry command in the memory system 3 is similar to that in the first embodiment.

FIG. 19 illustrates an example of a verify process accompanying a patrol process in the memory system 3.

First, the patrol processing module 124 determines a physical address to be read (target physical address). The patrol processing module 124 sends the determined target physical address to the read processing module 122. A method for determining the target physical address is described above in the first embodiment.

Further, the patrol processing module 124 acquires an LBA (target LBA) corresponding to the target physical address by using the zone-to-physical address conversion table 25. The zone-to-physical address conversion table 25 indicates a correspondence relationship between a start LBA of a zone and a physical address. For example, the patrol processing module 124 can acquire an LBA corresponding to the target physical address on the basis of a relative relationship between the physical address corresponding to the start LBA of the zone and the target physical address. The patrol processing module 124 sends the acquired target LBA to the verify processing module 123.

The read processing module 122 reads data of the target physical address from the NAND flash memory 5 using the target physical address sent by the patrol processing module

124. It is assumed that the read data has a configuration of the data structure 50 described above with reference to FIG. 4.

The read processing module 122 sends the read data to the patrol processing module 124 and the verify processing module 123. The read processing module 122 may store the read data in the DRAM 6 (more specifically, a read buffer).

The patrol processing module 124 performs an error correction process using the ECC 55 included in the read data. When the number of bits in which errors have been corrected by an error correction process (that is, the number of ECC error bits) exceeds a threshold, the patrol processing module 124 may notify the host 2 of reset or change of a zone storing the read data. For example, Reset Zone Recommended of NVMe is used for notification of the reset of the zone. The notification of the change of the zone includes setting the zone in an offline state.

Further, the verify processing module 123 verifies the integrity of the user data 52 included in the read data. An operation for verifying the integrity of the user data 52 by the verify processing module 123 is described above in the first embodiment. For example, the verify processing module 123 verifies the integrity of all the user data in each zone by sequentially processing the read data of a predetermined data length unit sent by the read processing module 122.

When the integrity of all the user data in a zone has been confirmed, the verify processing module 123 updates a last confirmation time associated with the zone in the verify status management table 23. On the other hand, when the integrity of at least part of user data in a zone is not confirmed, the verify processing module 123 does not update the last confirmation time associated with the target zone in the verify status management table 23. Note that, in a case where the integrity of at least part of user data in a zone is not confirmed, the verify processing module 123 may notify the host 2 of reset or change of the zone.

Through the above operation, the data read from the NAND flash memory 5 in the periodic patrol process can also be used for the verify process in the memory system 3. As a result, the number of times of reading data from the NAND flash memory 5 can be reduced as compared with a case where the patrol process and the verify process are separately performed, such as a case where the patrol process is periodically performed and the verify process is further performed in accordance with a verify command. Therefore, data can be maintained while mitigating the wear of the NAND flash memory 5.

Further, according to the second embodiment, as the last confirmation time is managed in units of zones, the data amount of the verify status management table 23 can be reduced as compared with the first embodiment in which the last confirmation time is managed in units of LBAs.

Figure 20:
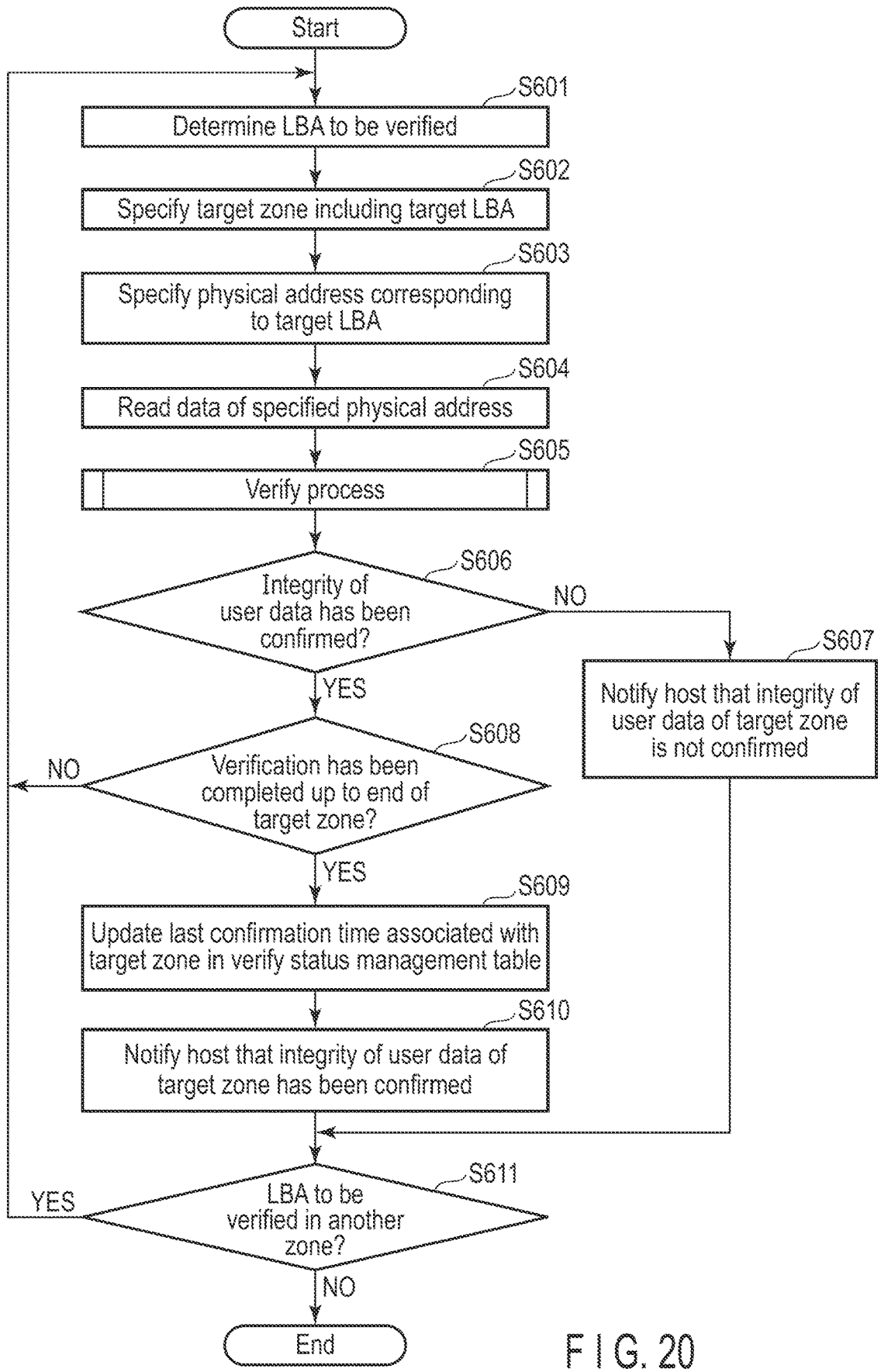
FIG. 20 is a flowchart illustrating an example of the procedure of a verify command process executed in the memory system of the second embodiment.

FIG. 20 is a flowchart illustrating an example of the procedure of a verify command process. The CPU 12 executes the verify command process in accordance with reception of a forced verify command (first verify command) from the host 2. Here, a case where a verify command designates an LBA range for which a verify process is performed using a start LBA and a size will be exemplified. Further, it is also assumed that the designated LBA range may correspond to one or more zones.

As illustrated in the flowchart, the CPU 12 determines an LBA to be verified (target LBA) (step S601). The LBA to be verified is an LBA within the LBA range designated in the verify command. Then, the CPU 12 specifies a zone including the target LBA (step S602). The CPU 12 uses, for example, the zone descriptor 26 to specify the zone including the target LBA. Hereinafter, the specified zone is also referred to as a target zone.

Next, the CPU 12 verifies integrity of user data 52 of the target LBA by performing a verify process on the user data 52 of the target LBA according to processing from step S603 to step S605. The processing from step S603 to step S605 is similar to the processing from step S102 to step S104 of the verify command process described above with reference to FIG. 9.

Next, the processing of the CPU 12 branches according to the result of the verify process (step S606).

When the result of the verify process indicates that the integrity of the user data is not confirmed (NO in step S606), the CPU 12 notifies the host 2 that the integrity of the user data of the target zone is not confirmed (step S607), and the processing of the CPU 12 proceeds to step S611. Note that, when the integrity of the user data is not confirmed, the CPU 12 does not update the last confirmation time associated with the target zone in the verify status management table 23.

On the other hand, when the result of the verify process indicates that the integrity of the user data has been confirmed (YES in step S606), the CPU 12 determines whether the verification has been completed up to the end of the target zone (step S608). Specifically, the CPU 12 uses, for example, the zone descriptor 26 to determine whether the current target LBA is an LBA at the end of the LBA range corresponding to the target zone. When the current target LBA is the LBA at the end of the LBA range corresponding to the target zone, the CPU 12 determines that the verification has been completed up to the end of the target zone.

When the verification has not completed up to the end of the target zone (NO in step S608), the processing of the CPU 12 returns to step S601 and continues the process for the subsequent LBA.

When the verification has been completed up to the end of the target zone (YES in step S608), the CPU 12 updates the last confirmation time associated with the target zone in the verify status management table 23 (step S609). For example, when the last confirmation time indicates an elapsed time that has elapsed since confirmation of the integrity of the user data, the CPU 12 sets zero as the last confirmation time associated with the target zone. Alternatively, the CPU 12 may set the current time as the last confirmation time associated with the target zone. Then, the CPU 12 notifies the host 2 that the integrity of the user data of the target zone has been confirmed (step S610), and the processing of the CPU 12 proceeds to step S611. Note that the CPU 12 may collectively notify the host 2 of verification results regarding user data of all zones corresponding to the LBA range designated in the verify command.

Next, the CPU 12 determines whether there is an LBA to be verified in another zone (step S611). That is, the CPU 12 determines whether an LBA in another zone for which the verify process for user data has not yet been performed remains in the LBA range designated in the verify command.

When there is an LBA to be verified in another zone (YES in step S611), the processing of the CPU 12 returns to step S601 and performs the process for the LBA in the other zone.

On the other hand, when there is no LBA to be verified in another zone (NO in step S611), that is, when the verify process for all the zones corresponding to the LBA range designated in the verify command has been completed, the CPU 12 ends the verify command process.

Through the verify command process described above, the CPU 12 may update the verify status management table

23. Specifically, the CPU 12 verifies integrity of user data in each of the one or more zones corresponding to the LBA range designated in the verify command. Then, the CPU 12 updates the last confirmation time associated with the zone including the user data whose integrity has been confirmed. As a result, the last confirmation time of the integrity of the user data stored in each zone can be managed in the memory system 3.

Figure 21:
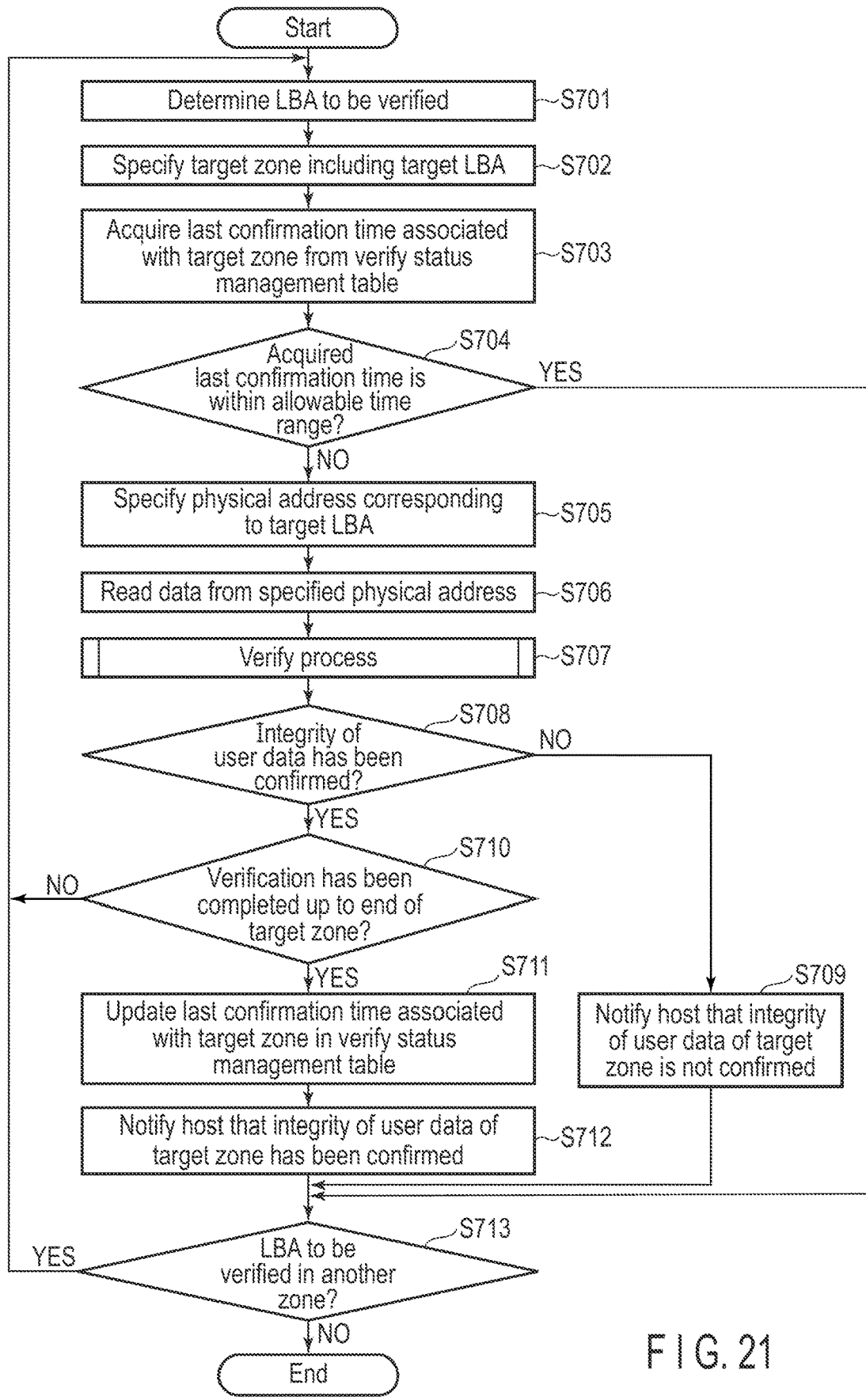
FIG. 21 is a flowchart illustrating another example of the procedure of the verify command process executed in the memory system of the second embodiment.

FIG. 21 is a flowchart illustrating another example of the procedure of the verify command process. The CPU 12 executes the verify command process in accordance with reception of a verify command (second verify command), which designates an allowable time range, from the host 2. Here, a case where a verify command designates an LBA range for which a verify process is performed will be exemplified. Further, it is also assumed that the designated LBA range may correspond to one or more zones.

As illustrated in the flowchart, the CPU 12 determines an LBA to be verified (target LBA) (step S701). The CPU 12 specifies a zone (target zone) including the target LBA (step S702). Then, the CPU 12 acquires a last confirmation time associated with the target zone from the verify status management table 23 (step S703).

The CPU 12 determines whether the acquired last confirmation time is within the allowable time range designated in the verify command (step S704).

When the acquired last confirmation time is out of the allowable time range (NO in step S704), according to processing from step S705 to step S712, the CPU 12 performs processing for verifying integrity of user data of the target LBA and notifying the host 2 of the verification result of the zone for which verification has been completed to the end. Since the processing from step S705 to step S712 is similar to the processing from step S603 to step S610 of the verify command process described above with reference to FIG. 20, the description thereof will be omitted. Then, the CPU 12 determines whether there is an LBA to be verified in another zone (step S713). When there is an LBA to be verified in another zone (YES in step S713), the processing of the CPU 12 returns to step S701 and performs the process for the LBA in the other zone. On the other hand, when there is no LBA to be verified in another zone (NO in step S713), the CPU 12 ends the verify command process.

When the acquired last confirmation time is within the allowable time range (YES in step S704), the CPU 12 determines whether there is an LBA to be verified in another zone (step S713). When there is an LBA to be verified in another zone (YES in step S713), the processing of the CPU 12 returns to step S701 and performs the process for the LBA in the other zone. On the other hand, when there is no LBA to be verified in another zone (NO in step S713), the CPU 12 ends the verify command process. That is, when the acquired last confirmation time is within the allowable time range, the CPU 12 may perform the processing for the other zone without performing the processing for verifying the integrity of the user data of the target zone. When the acquired last confirmation time is within the allowable time range, the CPU 12 may notify the host 2 that the integrity of the user data of the target zone has already been confirmed at the time within the allowable time range.

Through the verify command process described above, the CPU 12 may update the verify status management table 23 when the last confirmation time corresponding to the target zone is out of the allowable time range. As a result, the last confirmation time of the user data stored in each zone can be managed in the memory system 3.

When the last confirmation time corresponding to the target zone is within the allowable time range, the CPU 12 does not perform the verify process for verifying the integrity of the user data of the target zone (that is, the user data of the LBA range allocated to the target zone). That is, the CPU 12 does not perform the verify process on the zone for which the integrity of the user data has been confirmed within the allowable time range. In this manner, the CPU 12 may reduce the number of times of reading the user data of each zone from the NAND flash memory 5 by using the last confirmation time recorded in the verify status management table 23. Therefore, the wear of the NAND flash memory 5 can be mitigated.

Figure 22:
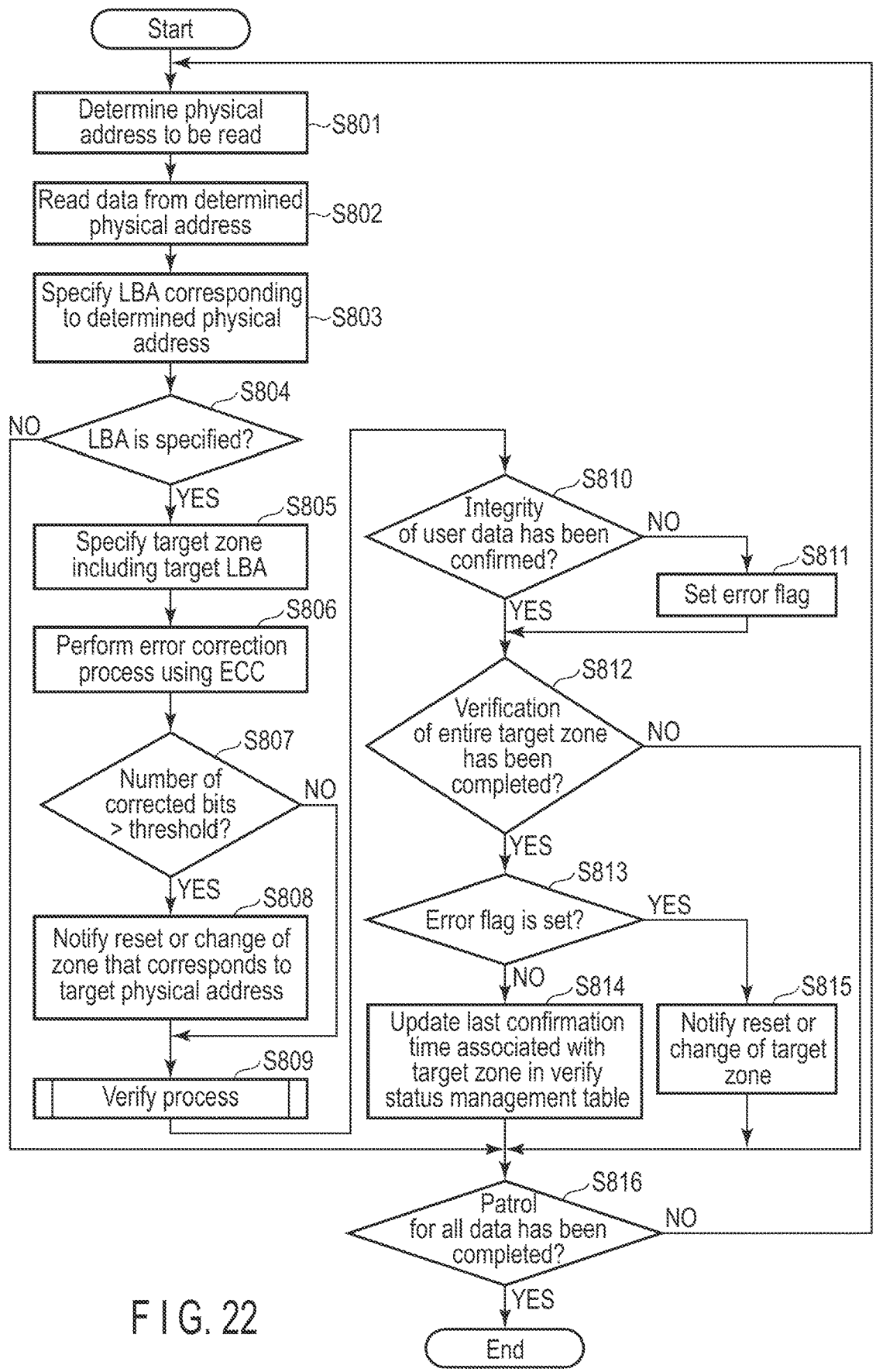
FIG. 22 is a flowchart illustrating an example of the procedure of the verify process accompanying the patrol process executed in the memory system of the second embodiment.

FIG. 22 is a flowchart illustrating an example of the procedure of a verify process accompanying a patrol process. The CPU 12 executes the patrol process and the verify process accompanying the patrol process, for example, at regular time intervals.

As illustrated in the flowchart, the CPU 12 performs the patrol process on the NAND flash memory 5 in processing from step S801 to step S806. The patrol process is a process for detecting each block storing data in which the number of error bits exceeds a threshold among blocks included in the NAND flash memory 5. For example, when a physical address of the detected block corresponds to an LBA included in a zone, the CPU 12 notifies the host 2 of reset or change of the zone.

Specifically, the CPU 12 determines a physical address to be read (step S801). The CPU 12 reads data of the target physical address from the NAND flash memory 5 (step S802). Then, the CPU 12 specifies an LBA corresponding to the target physical address using the zone-to-physical address conversion table 25 (step S803).

The CPU 12 determines whether the LBA corresponding to the target physical address is specified (step S804). In other words, the CPU 12 determines whether the read data of the target physical address is valid data or invalid data.

When the LBA corresponding to the target physical address is not specified (NO in step S804), that is, when the read data is invalid data, the processing of the CPU 12 proceeds to step S816. The CPU 12 proceeds to processing for subsequent data without processing the read data that is invalid data.

When the LBA corresponding to the target physical address is specified (YES in step S804), that is, when the read data is valid data, the CPU 12 specifies a zone (target zone) including the specified LBA (step S805). Then, the CPU 12 performs an error correction process using the ECC 55 on the read data (step S806). The CPU 12 determines whether the number of bits in which errors have been corrected in the error correction process exceeds a threshold (step S807). When the number of bits in which the errors have been corrected in the error correction process exceeds the threshold (YES in step S807), the CPU 12 notifies the host 2 of reset or change of the target zone (step S808), and the processing of the CPU 12 proceeds to step S809. The host 2 may reset or change the target zone in accordance with this notification. On the other hand, when the number of bits in which the errors have been corrected in the error correction process is the threshold or less (NO in step S807), the processing of the CPU 12 proceeds to step S809.

Next, the CPU 12 performs a verify process using the read data (step S809). The specific procedure of the verify process is described above with reference to the flowchart of FIG. 10. Since the read data is data that has been already read in step S802 for the patrol process, the CPU 12 does not need to read data from the NAND flash memory 5 again in order to perform the verify process.

The processing of the CPU 12 branches according to the result of the verify process (step S810).

Specifically, when the result of the verify process indicates that the integrity of the user data has been confirmed (YES in step S810), the processing of the CPU 12 proceeds to step S812. On the other hand, when the result of the verify process indicates that the integrity of the user data is not confirmed (NO in step S810), the CPU 12 sets an error flag of the target zone (step S811), and the processing of the CPU 12 proceeds to step S812. The error flag indicates that integrity of user data of at least one LBA has not been confirmed in the corresponding zone. That is, the error flag indicates that the corresponding zone stores the user data whose integrity is not confirmed. Note that it is assumed that an error flag of each zone is in a cleared state at the time of starting the verify process accompanying the patrol process.

Next, the CPU 12 determines whether verification of the entire the target zone has been completed (step S812). When the verification for the entire target zone has not been completed (NO in step S812), the processing of the CPU 12 proceeds to step S816.

When the verification of the entire target zone has been completed (YES in step S812), the CPU 12 determines whether the error flag of the target zone is set (step S813). When the error flag of the target zone is cleared (NO in step S813), the CPU 12 updates a last confirmation time associated with the target zone in the verify status management table 23 (step S814), and the processing of the CPU 12 proceeds to step S816. That is, when the integrity of all the user data stored in the target zone has been confirmed, the CPU 12 updates the last confirmation time associated with the target zone in the verify status management table 23.

On the other hand, when the error flag of the target zone is set (YES in step S813), the CPU 12 notifies the host 2 of reset or change of the target zone (step S815), and the processing of the CPU 12 proceeds to step S816. When the integrity of at least part of user data stored in the target zone is not confirmed, the CPU 12 does not update the last confirmation time associated with the target zone in the verify status management table 23.

Next, the CPU 12 determines whether the patrol process for all the data in the NAND flash memory 5 has been completed (step S816). That is, the CPU 12 determines whether data that has not yet been read in the patrol process remains in the blocks in the NAND flash memory 5.

When the patrol process for all the data has not been completed (NO in step S816), the processing of the CPU 12 returns to step S801 and performs processing for data that has not been read yet.

On the other hand, when the patrol process for all the data has been completed (YES in step S816), the CPU 12 ends the patrol process and the verify process.

Through the patrol process and the verify process described above, the CPU 12 can also perform the verify process on the data read in the patrol process. As a result, the CPU 12 can reduce the number of times of reading data from the NAND flash memory 5 as compared with a case where the patrol process and the verify process are separately performed. Therefore, data can be maintained while mitigating the wear of the NAND flash memory 5.

As described above, it is possible to maintain data while mitigating the wear of the nonvolatile memory according to the first and second embodiments. The controller 4 manages at least one storage area that is obtained by logically dividing a storage space of the NAND flash memory 5. The controller

4 manages information on a time in which integrity of data stored in one or more storage areas in the at least one storage area has been confirmed last (for example, the verify status management table 23).

It is possible to control the timing of performing a verify process on data stored in each of the one or more storage areas by using the information. Therefore, the number of times of reading data from the NAND flash memory 5 can be reduced, and thus, data can be maintained while mitigating the wear of the NAND flash memory 5.

Each of various functions described in the embodiment may be realized by a circuit (e.g., processing circuit). An exemplary processing circuit may be a programmed processor such as a central processing unit (CPU). The processor executes computer programs (instructions) stored in a memory thereby performs the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to the embodiment may be realized in a processing circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
 a nonvolatile memory; and
 a controller configured to manage at a first storage area and a second storage area that are obtained by logically dividing a storage space of the nonvolatile memory, wherein
 first storage area and the second storage area store data pieces, respectively,
 the controller is configured to manage first information on times in which integrity of the data pieces have been confirmed last, respectively,
 in response to receiving a verify request from a host, the controller is configured to transmit information to the host, the information being on a time in which the integrity of a data piece stored in the first storage area or the second storage area has been confirmed last,
 the times in which integrity of the data pieces have been confirmed last, respectively, indicate times elapsed since the integrity of the data pieces have been confirmed last, respectively, and
 the controller is further configured to:
  receive an inquiry from the host; and
  in accordance with the inquiry, transmit, to the host, information that indicates a maximum value of the times by using the first information.

2. The memory system according to claim 1, wherein the controller is further configured to:
 receive an inquiry that designates the first storage area from the host; and in accordance with the inquiry, transmit, to the host, information on a time in which integrity of a data piece stored in the first storage area has been confirmed last.

3. The memory system according to claim 1, wherein the controller is further configured to:
receive, from the host, a verify request that designates the first storage area; and
in accordance with the verify request,
read a first data piece from the first storage area, verify integrity of the read first data piece, and
update information on a time in which the integrity of the first data piece has been confirmed in a case where the integrity of the read first data piece has been confirmed.

4. The memory system according to claim 3, wherein the controller is configured to verify the integrity of the first data piece using protection information that is read from the first storage area together with the first data piece.

5. The memory system according to claim 3, wherein the controller is configured to verify the integrity of the first data piece using a CRC code that is read from the first storage area together with the first data piece.

6. The memory system according to claim 1, wherein the controller is further configured to:
receive, from the host, a verify request that designates the first storage area and an allowable time range; and
in accordance with the verify request,
read a first data piece from the first storage area in a case where a time based on the first information at which integrity of the first data piece stored in the first storage area has been confirmed last is out of the allowable time range,
verify the integrity of the read first data piece, and
update information on the time in which the integrity of the first data piece has been confirmed last in a case where the integrity of the read first data piece has been confirmed.

7. The memory system according to claim 1, wherein the controller is further configured to:
receive, from the host, a verify request that designates the first storage area and an allowable time range; and
in accordance with the verify request,
skip reading of a first data piece from the first storage area and notify the host that integrity of the first data piece has already been confirmed in a case where a time based on the first information at which the integrity of the first data piece stored in the first storage area has been confirmed last is within the allowable time range.

8. The memory system according to claim 1, wherein the controller is further configured to:
read a first data piece from the first storage area by performing a patrol process on the nonvolatile memory and verify integrity of the read first data piece; and
update information on a time in which the integrity of the first data piece has been confirmed last in a case where the integrity of the read first data piece has been confirmed.

9. The memory system according to claim 1, wherein the first storage area or the second storage area corresponds to at least one logical address.

10. The memory system according to claim 1, wherein the first storage area or the second storage area corresponds to at least one zone, and
the at least one zone corresponds to at least one logical address range.

11. The memory system according to claim 1, wherein managing the first information is based on a verify status management table.

12. The memory system according to claim 1, wherein managing the first information comprises updating a verify status management table.

13. A memory system comprising:
a nonvolatile memory; and
a controller configured to manage a first storage area and a second storage area that are obtained by logically dividing a storage space of the nonvolatile memory, wherein
the first storage area and the second storage area store data pieces, respectively,
the controller is configured to manage first information on times in which integrity of the data pieces have been confirmed last, respectively,
in response to receiving a verify request from a host, the controller is configured to transmit information to the host, the information being on a time in which the integrity of a data piece stored in the first storage area or the second storage area has been confirmed last,
the times in which integrity of the data pieces have been confirmed last, respectively, indicate times at which the integrity of the data pieces have been confirmed last, respectively, and
the controller is further configured to:
receive an inquiry from the host; and
in accordance with the inquiry, transmit, to the host, information that indicates an oldest time of the times by using the first information.

14. The memory system according to claim 13, wherein the controller is further configured to:
receive an inquiry that designates the first storage area from the host; and
in accordance with the inquiry, transmit, to the host, information on a time in which integrity of a data piece stored in the first storage area has been confirmed last.

15. The memory system according to claim 13, wherein the controller is further configured to:
receive, from the host, a verify request that designates the first storage area; and
in accordance with the verify request,
read a first data piece from the first storage area, verify integrity of the read first data piece, and
update information on a time in which the integrity of the first data piece has been confirmed in a case where the integrity of the read first data piece has been confirmed.

16. The memory system according to claim 15, wherein the controller is configured to verify the integrity of the first data piece using protection information that is read from the first storage area together with the first data piece.

17. The memory system according to claim 15, wherein the controller is configured to verify the integrity of the first data piece using a CRC code that is read from the first storage area together with the first data piece.

18. The memory system according to claim 13, wherein the controller is further configured to:
- receive, from the host, a verify request that designates the first storage area and an allowable time range; and
- in accordance with the verify request,
  - read a first data piece from the first storage area in a case where a time based on the first information at which integrity of the first data piece stored in the first storage area has been confirmed last is out of the allowable time range,
  - verify the integrity of the read first data piece, and
  - update information on the time in which the integrity of the first data piece has been confirmed last in a case where the integrity of the read first data piece has been confirmed.

19. The memory system according to claim 13, wherein the controller is further configured to:
- receive, from the host, a verify request that designates the first storage area and an allowable time range; and
- in accordance with the verify request,
  - skip reading of a first data piece from the first storage area and notify the host that integrity of the first data piece has already been confirmed in a case where a time based on the first information at which the integrity of the first data piece stored in the first storage area has been confirmed last is within the allowable time range.

20. The memory system according to claim 13, wherein the controller is further configured to:
- read a first data piece from the first storage area by performing a patrol process on the nonvolatile memory and verify integrity of the read first data piece; and
- update information on a time in which the integrity of the first data piece has been confirmed last in a case where the integrity of the read first data piece has been confirmed.

21. The memory system according to claim 13, wherein the first storage area or the second storage area corresponds to at least one logical address.

22. The memory system according to claim 13, wherein the first storage area or the second storage area corresponds to at least one zone, and the at least one zone corresponds to at least one logical address range.

23. The memory system according to claim 13, wherein managing the first information is based on a verify status management table.

24. The memory system according to claim 13, wherein managing the first information comprises updating a verify status management table.

* * * * *